(12) United States Patent  
Schatz et al.

(10) Patent No.: US 9,309,839 B2
(45) Date of Patent: Apr. 12, 2016

(54) HEAT EXCHANGER AND METHOD OF MANUFACTURING THE SAME

(71) Applicant: Modine Manufacturing Company, Racine, WI (US)

(72) Inventors: Harald Schatz, Reutlingen (DE); Michael Daniel, Neuhausen (DE); Thomas Grotophorst, Oak Creek, WI (US); Jeff Schernecker, Racine, WI (US); Daniel Hornback, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 665 days.

(21) Appl. No.: 13/623,995

(22) Filed: Sep. 21, 2012

(65) Prior Publication Data

US 2013/0074814 A1 Mar. 28, 2013

Related U.S. Application Data

(63) Continuation-in-part of application No. 13/051,128, filed on Mar. 18, 2011, now Pat. No. 8,844,504.

(60) Provisional application No. 61/315,055, filed on Mar. 18, 2010.

(51) Int. Cl.
*F02B 47/00* (2006.01)
*F02B 47/08* (2006.01)
(Continued)

(52) U.S. Cl.
CPC ....... *F02M 25/0731* (2013.01); *F02M 25/0737* (2013.01); *F28D 7/1684* (2013.01);
(Continued)

(58) Field of Classification Search
CPC  F28D 7/1684; F28D 1/0316; F02M 25/0737; Y02T 10/121; F28F 3/025; B23P 15/26
USPC ............... 123/568.12, 563, 41.31; 60/599; 165/41–43, 51
See application file for complete search history.

(56) References Cited

U.S. PATENT DOCUMENTS 1,770,208 A 7/1930 Kemnal
1,805,101 A 5/1931 Modine
(Continued)

FOREIGN PATENT DOCUMENTS

CN 101194140 6/2008
DE 3743293 6/1989
(Continued)

OTHER PUBLICATIONS

EP 11002113.6 Extended European Search Report dated May 11, 2011 (5 pages).

*Primary Examiner* — Hai Huynh
*Assistant Examiner* — Gonzalo Laguarda
(74) *Attorney, Agent, or Firm* — Michael Best & Friedrich LLP

(57) ABSTRACT

An exhaust gas recirculation cooler that includes an inlet tank, an outlet tank, and an exhaust gas flow conduit in fluid communication with the inlet tank and the outlet tank. The exhaust gas flow conduit includes a first end, a second end, a first narrow side, a second narrow side, a first channel adjacent the first narrow side and extending between the first end and the second end, a second channel adjacent the second narrow side and extending between the first end and the second end, and a plurality of third channels located between the first channel and the second channel and extending between the first end and the second end. At least one of the inlet tank and the outlet tank includes a wall that inhibits exhaust gas from flowing through the first channel while allowing exhaust gas flow through the plurality of third channels.

20 Claims, 16 Drawing Sheets

(51) Int. Cl.

| | | |
|---|---|---|
| *F02M 25/07* | (2006.01) | |
| *F28F 3/02* | (2006.01) | |
| *F28F 9/00* | (2006.01) | |
| *F28F 9/02* | (2006.01) | |
| *F28F 13/06* | (2006.01) | |
| *F28F 19/00* | (2006.01) | |
| *F28D 7/16* | (2006.01) | |
| *F28F 1/02* | (2006.01) | |
| *F28D 21/00* | (2006.01) | |

(52) U.S. Cl.
CPC ............... *F28F 1/022* (2013.01); *F28F 3/025* (2013.01); *F28F 9/005* (2013.01); *F28F 9/0265* (2013.01); *F28F 13/06* (2013.01); *F28F 19/002* (2013.01); *F02M 25/0728* (2013.01); *F28D 21/0003* (2013.01); *F28F 2009/029* (2013.01); *F28F 2220/00* (2013.01); *Y02T 10/121* (2013.01)

(56) References Cited

U.S. PATENT DOCUMENTS

| | | | |
|---|---|---|---|
| 1,847,743 A | 3/1932 | Anderson | |
| 1,974,402 A | 9/1934 | Templeton | |
| 2,013,186 A | 9/1935 | Price | |
| 2,044,457 A | 6/1936 | Young | |
| 2,184,657 A | 12/1939 | Young | |
| 2,209,974 A | 8/1940 | Jacobus | |
| 2,237,516 A | 4/1941 | Young | |
| 2,258,041 A | 10/1941 | Young | |
| 2,308,119 A | 1/1943 | Spieth | |
| 2,327,491 A | 8/1943 | Blais | |
| 2,443,703 A | 6/1948 | Christensen | |
| 2,505,790 A | 5/1950 | Panthofer | |
| 2,984,456 A | 5/1961 | Young | |
| 4,125,280 A | 11/1978 | Kuzel | |
| 4,137,982 A | 2/1979 | Crews et al. | |
| 4,195,943 A | 4/1980 | Williams | |
| 4,202,407 A | 5/1980 | Woitowitz | |
| 4,254,819 A | 3/1981 | Worrell | |
| 4,295,521 A | 10/1981 | Sommars | |
| 4,369,837 A | 1/1983 | Moranne | |
| 4,501,321 A | 2/1985 | Real et al. | |
| 4,651,816 A | 3/1987 | Struss et al. | |
| 4,706,461 A | 11/1987 | Pratt et al. | |
| 4,805,693 A | 2/1989 | Flessate | |
| 4,997,033 A | 3/1991 | Ghiani et al. | |
| 5,052,475 A | 10/1991 | Grundy | |
| 5,127,466 A | 7/1992 | Ando | |
| 5,174,372 A | 12/1992 | Potier et al. | |
| 5,197,538 A | 3/1993 | Nagasaka et al. | |
| 5,226,235 A | 7/1993 | Lesage | |
| 5,234,051 A | 8/1993 | Weizenburger et al. | |
| 5,299,636 A | 4/1994 | Potier | |
| 5,301,748 A | 4/1994 | Potier | |
| 5,303,770 A | 4/1994 | Dierbeck | |
| 5,311,934 A | 5/1994 | Potier | |
| 5,325,915 A | 7/1994 | Fouts et al. | |
| 5,366,006 A | 11/1994 | Lu et al. | |
| 5,429,181 A | 7/1995 | Tordjeman | |
| 5,476,138 A | 12/1995 | Iwasaki et al. | |
| 5,490,560 A | 2/1996 | Helms et al. | |
| 5,505,257 A | 4/1996 | Goetz, Jr. | |
| 5,511,613 A | 4/1996 | Mohn et al. | |
| 5,535,821 A | 7/1996 | Potier | |
| 5,538,079 A | 7/1996 | Pawlick | |
| 5,566,748 A | 10/1996 | Christensen | |
| 5,671,803 A | 9/1997 | Tepas et al. | |
| RE35,710 E | 1/1998 | Shinmura | |
| 5,720,341 A | 2/1998 | Watanabe et al. | |
| 5,894,649 A | 4/1999 | Lambert et al. | |
| 6,293,334 B1 | 9/2001 | Ghiani | |
| 6,311,768 B1 | 11/2001 | Jamison et al. | |
| 6,318,450 B1 | 11/2001 | Acre | |
| 6,330,747 B1 | 12/2001 | Lambert et al. | |
| 6,357,520 B1 | 3/2002 | Kato et al. | |
| 6,412,547 B1 | 7/2002 | Siler | |
| 6,460,610 B2 | 10/2002 | Lambert et al. | |
| 6,527,046 B1 | 3/2003 | White | |
| 6,530,424 B2 * | 3/2003 | Jamison et al. | 165/153 |
| 6,601,640 B1 | 8/2003 | Staffa et al. | |
| 6,817,404 B2 | 11/2004 | Frana-Guthrie et al. | |
| 6,843,097 B2 | 1/2005 | Tatsuta et al. | |
| 6,874,570 B2 | 4/2005 | Horiuchi | |
| 6,907,916 B2 | 6/2005 | Koyama | |
| 6,928,730 B2 | 8/2005 | Beldam et al. | |
| 6,988,532 B2 | 1/2006 | Hamada | |
| 7,036,561 B2 | 5/2006 | Yagi et al. | |
| 7,073,571 B2 | 7/2006 | Yu et al. | |
| 7,108,049 B2 | 9/2006 | Makino et al. | |
| 7,131,488 B2 | 11/2006 | Ozaki | |
| 7,143,824 B2 | 12/2006 | Emrich et al. | |
| 7,147,046 B2 | 12/2006 | Sanada et al. | |
| 7,198,095 B2 | 4/2007 | Nguyen | |
| 7,243,707 B2 * | 7/2007 | Brost et al. | 165/103 |
| 7,284,594 B2 | 10/2007 | Sanada et al. | |
| 7,303,002 B2 | 12/2007 | Usui et al. | |
| 7,392,837 B2 | 7/2008 | Makino et al. | |
| 7,520,318 B2 | 4/2009 | Kwon | |
| 7,637,309 B2 | 12/2009 | Contet | |
| 7,921,828 B2 * | 4/2011 | Knafl et al. | 123/568.12 |
| 7,931,013 B2 * | 4/2011 | Castaño Gonzalez et al. | 123/568.12 |
| 2004/0069468 A1 | 4/2004 | Lamich et al. | |
| 2005/0161206 A1 | 7/2005 | Ambros et al. | |
| 2005/0263263 A1 | 12/2005 | Merklein et al. | |
| 2006/0118285 A1 | 6/2006 | Emrich et al. | |
| 2006/0124283 A1 * | 6/2006 | Abi-Akar et al. | 165/133 |
| 2006/0201663 A1 * | 9/2006 | Strahle et al. | 165/164 |
| 2008/0230213 A1 | 9/2008 | Roll | |
| 2008/0236792 A1 * | 10/2008 | Mast et al. | 165/80.4 |
| 2008/0264609 A1 | 10/2008 | Lutz et al. | |
| 2009/0194265 A1 * | 8/2009 | Nakamura | 165/149 |
| 2009/0235662 A1 | 9/2009 | Knafl et al. | |
| 2009/0250201 A1 | 10/2009 | Grippe et al. | |
| 2009/0260605 A1 | 10/2009 | Janssen et al. | |
| 2011/0226222 A1 | 9/2011 | Raduenz et al. | |

FOREIGN PATENT DOCUMENTS

| | | |
|---|---|---|
| DE | 3834822 | 4/1990 |
| DE | 4009726 | 10/1991 |
| DE | 19857435 | 6/1996 |
| DE | 19509654 | 9/1996 |
| DE | 19819247 | 11/1999 |
| DE | 19942458 | 3/2000 |
| DE | 10244629 | 4/2003 |
| DE | 102006031653 | 1/2008 |
| DE | 102007031824 | 3/2008 |
| DE | 102006058096 | 6/2008 |
| EP | 0515924 | 12/1992 |
| EP | 0656517 | 6/1995 |
| EP | 0704666 | 4/1996 |
| EP | 1764570 | 3/2007 |
| EP | 1870656 | 12/2007 |
| EP | 1923653 | 5/2008 |
| EP | 1923654 | 5/2008 |
| GB | 2048451 | 12/1980 |
| JP | 2004325007 | 11/2004 |
| JP | 2005083647 | 3/2005 |
| WO | 2005050120 | 6/2005 |
| WO | 2006133748 | 12/2006 |
| WO | 2007105992 | 9/2007 |
| WO | 2010003807 | 1/2010 |

\* cited by examiner

HEAT EXCHANGER AND METHOD OF MANUFACTURING THE SAME

CROSS-REFERENCE TO RELATED APPLICATIONS

This application is a continuation-in-part of U.S. patent application Ser. No. 13/051,128, filed Mar. 18, 2011, which claims priority to U.S. Provisional Patent Application No. 61/315,055, filed Mar. 18, 2010, the entire contents of both of which are incorporated by reference herein.

BACKGROUND

Heat exchangers used to cool gases of all types are known in the art. By way of example only, and for purposes of illustration herein, many heat exchangers are adapted to cool exhaust gases (e.g., produced by internal combustion engines, gas turbines, or other exhaust producing processes or devices). In certain applications commonly referred to as exhaust gas recirculation (EGR), some portion of the exhaust gas produced by an engine is cooled and recirculated back to the intake manifold of the engine. The relatively inert exhaust gas is added to the fresh combustion air charge delivered to the intake manifold, and can serve to lower the combustion temperature within the engine, thereby reducing the rate of formation of $NO_x$, an environmental pollutant. In order to achieve the foregoing in this exemplary application, it is typically necessary for the temperature of the recirculated exhaust to be substantially reduced prior to its re-entry into the engine, and one or more heat exchangers (EGR coolers or EGRC) are typically used to cool the recirculated exhaust.

Fouling of heat exchange surfaces is a known problem when heat exchangers are exposed to many types of gases. Fouling refers to the accumulation of matter on the heat exchange surfaces, which has a detrimental impact on heat exchanger performance. With reference again to the case of exhaust gas heat exchangers, for example, particulates that are entrained within the exhaust flow are deposited onto surfaces that are exposed to the exhaust. The accumulation of particulate on the surfaces adds an additional resistance to the transfer of heat energy from the exhaust gas to the cooling fluid of the heat exchanger, and increases the pressure drop through the heat exchanger by constricting the available flow area.

The impact of fouling is typically taken into account when sizing a heat exchanger for cooling by applying a fouling factor in the heat transfer calculation. The fouling factor decreases the effective overall heat transfer coefficient of the heat exchanger, in order to ensure that the heat exchanger will be appropriately sized for the required heat transfer capability when operating in a fouled state.

The fouling factor will vary with the specifics of each heat exchanger geometry, and will also vary with the conditions under which the heat exchanger is operated. Specifically, it is known that the fouling factor has an inverse relationship with the Reynolds number (Re) of the flow. As is known in the art, the Reynolds number relates the flow's inertial forces to the flow's viscous forces. The Reynolds number can be calculated by the equation:

$$Re = \frac{m \cdot D}{A \cdot \mu},$$

where m is the mass flow rate of the fluid, A is the cross-sectional area of the flow path, D is the hydraulic diameter of the flow path, and $\mu$ is the dynamic viscosity of the fluid.

In the design and sizing of heat exchangers in general, a common approach to improving the heat exchanger performance is to increase the surface area density, or the amount of extended surface per unit volume that is exposed to the heat exchange fluid. This approach will result in a decrease in the Reynolds number, since the hydraulic diameter of the channels will be reduced. In a heat exchanger exposed to exhaust gas, this decrease in Reynolds number will tend to increase the fouling factor, thereby reducing or even entirely eliminating the desired improvement in heat exchanger performance.

In light of the continuing need for heat exchangers operable in a fouled state, having a high surface area density, and/or having a reduced susceptibility to performance degradation due to fouling, improved heat exchangers continue to be welcome additions to the art.

SUMMARY OF THE INVENTION

In some embodiments of the invention, an EGR cooler includes an exhaust gas flow conduit having first and second opposing arcuately shaped narrow sides with broad and substantially flat sides extending therebetween. The exhaust gas flow conduit comprises a first flow channel adjacent the first arcuately shaped narrow side, having a first flow area and a first hydraulic diameter. The exhaust gas flow conduit further comprises a second flow channel adjacent the second arcuately shaped narrow side, having a second flow area and a second hydraulic diameter similar to the first flow area and the first hydraulic diameter, respectively. The exhaust gas flow conduit further comprises a plurality of third flow channels located between the first and second flow channels, each of the third flow channels having a third flow area and a third hydraulic diameter. The third flow area is substantially smaller than the first and second flow areas, and the third hydraulic diameter is substantially smaller than the first and second hydraulic diameters. A fluid flowing through the exhaust gas flow conduit is substantially blocked from accessing the first and second flow channels by a plate located at one of an inlet and an outlet of the exhaust gas flow conduit.

In some embodiments, the exhaust gas flow conduit is one of a plurality of similar exhaust gas flow conduits, and the plate substantially blocks access to the first and second flow channels of the plurality of exhaust gas flow conduits.

In some embodiments, the EGR cooler further includes a header to receive one of an inlet and an outlet end of the exhaust gas flow conduit. In some such embodiments, the flow blocking plate is attached to the header at at least one attachment point.

In some embodiments, the plurality of third flow channels is at least partially defined by a convoluted fin structure. In some such embodiments, the convoluted fin structure includes fin crests connected to the broad flat sides of the exhaust gas flow conduit.

In one embodiment, the invention provides an exhaust gas recirculation cooler configured to cool exhaust gas from an engine. The exhaust gas recirculation cooler includes an inlet tank configured to receive the exhaust gas from the engine, an outlet tank configured to direct the exhaust gas back toward the engine, and an exhaust gas flow conduit in fluid communication with the inlet tank and the outlet tank. The exhaust gas flow conduit includes a first end adjacent the inlet tank, a second end adjacent the outlet tank, a first narrow side, a second narrow side opposite the first narrow side, substantially flat broad sides extending between the first narrow side and the second narrow side, a first channel adjacent the first narrow side and extending between the first end and the second end, a second channel adjacent the second narrow side and extending between the first end and the second end, and a plurality of third channels located between the first channel and the second channel and extending between the first end and the second end. At least one of the inlet tank and the outlet tank includes a wall that inhibits the exhaust gas from flowing through the first channel while allowing exhaust gas flow through the plurality of third channels.

In another embodiment, the invention provides an exhaust gas flow blocking means located at one of the first end and the second end of the exhaust gas flow conduit to inhibit the exhaust gas from flowing through at least one of the first channel and the second channel while allowing exhaust gas flow through the plurality of third channels.

In yet another embodiment, the invention provides a wall located at one of the first end and the second end of the exhaust gas flow conduit to inhibit the exhaust gas from flowing through at least one of the first channel and the second channel while allowing exhaust gas flow through the plurality of third channels.

Although the heat exchanger types and applications described herein are EGR heat exchangers, it will be appreciated that the various features, structures, and methods described herein are applicable to heat exchangers used for cooling any other type of gas in any application.

Other objects, features, and advantages of the invention will become apparent from a review of the entire specification, including the appended drawings.

DETAILED DESCRIPTION

Figure 1:
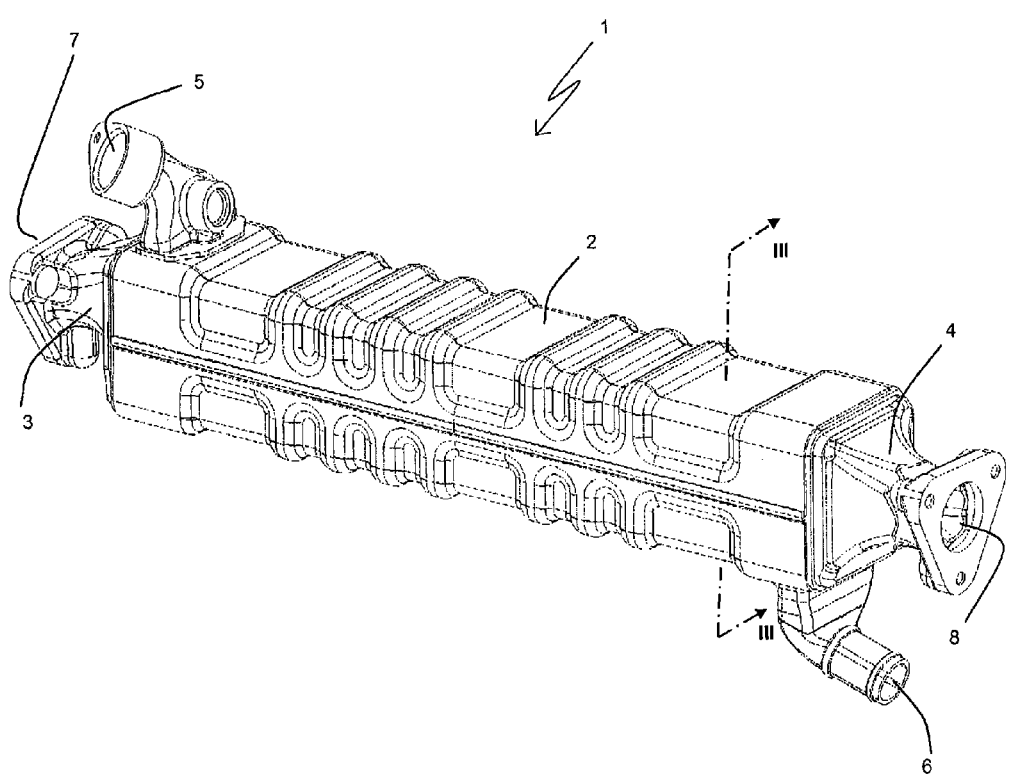
FIG. 1 is a perspective view of an EGR cooler according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

An embodiment of a heat exchanger 1 according to the present invention is shown in FIGS. 1-4 and includes an outer casing 2, an exhaust gas inlet tank 3 and an exhaust gas outlet tank 4 at opposing ends of the casing 2, and coolant ports 5 and 6. The embodiment shown may be especially useful as an EGR cooler to cool a flow of recirculated exhaust gas entering the heat exchanger 1 through an exhaust flow inlet port 7 from the exhaust manifold of an internal combustion engine (not shown), and to deliver the cooled flow from the exhaust flow exit or outlet port 8 to an intake manifold of the engine. It should be recognized, however, that the heat exchanger 1 may find utility as an exhaust gas cooler or as a heat exchanger for cooling or heating any other gases in any other application as well.

Figure 2:
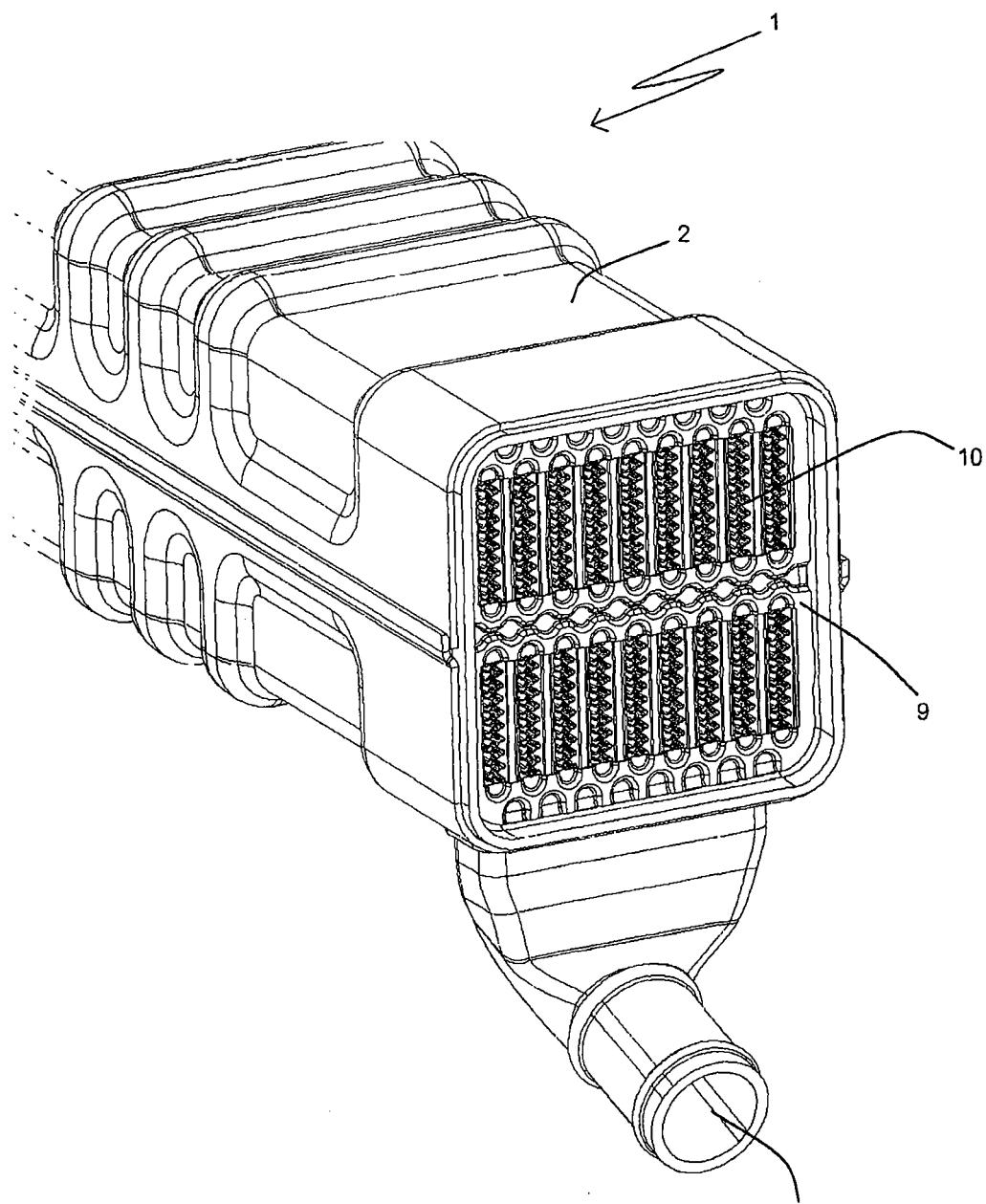
FIG. 2 is a perspective view of a portion of the EGR cooler of FIG. 1, with some parts removed.
Figure 3:
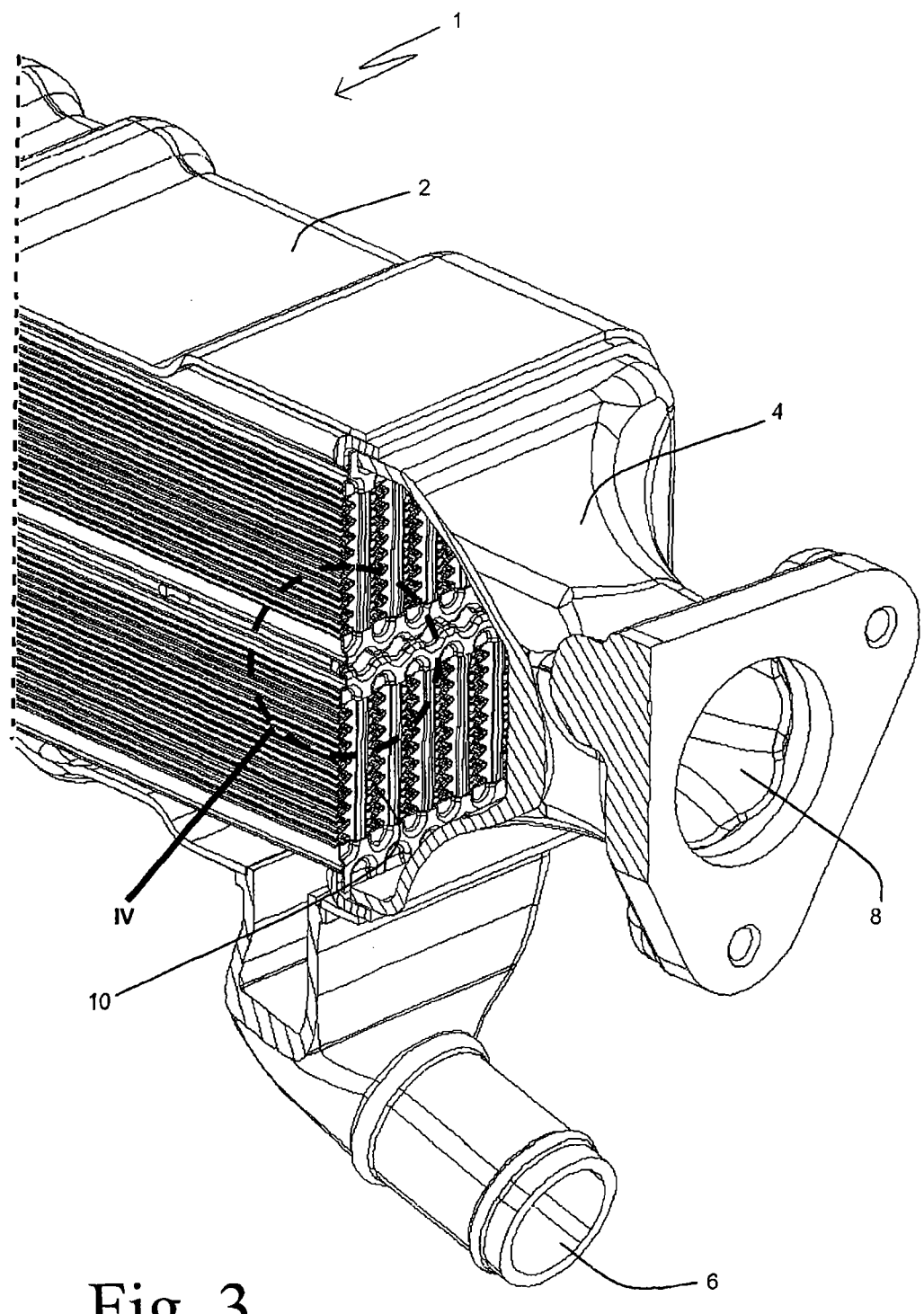
FIG. 3 is a partial sectional view taken along line III-III of FIG. 1.
Figure 4:
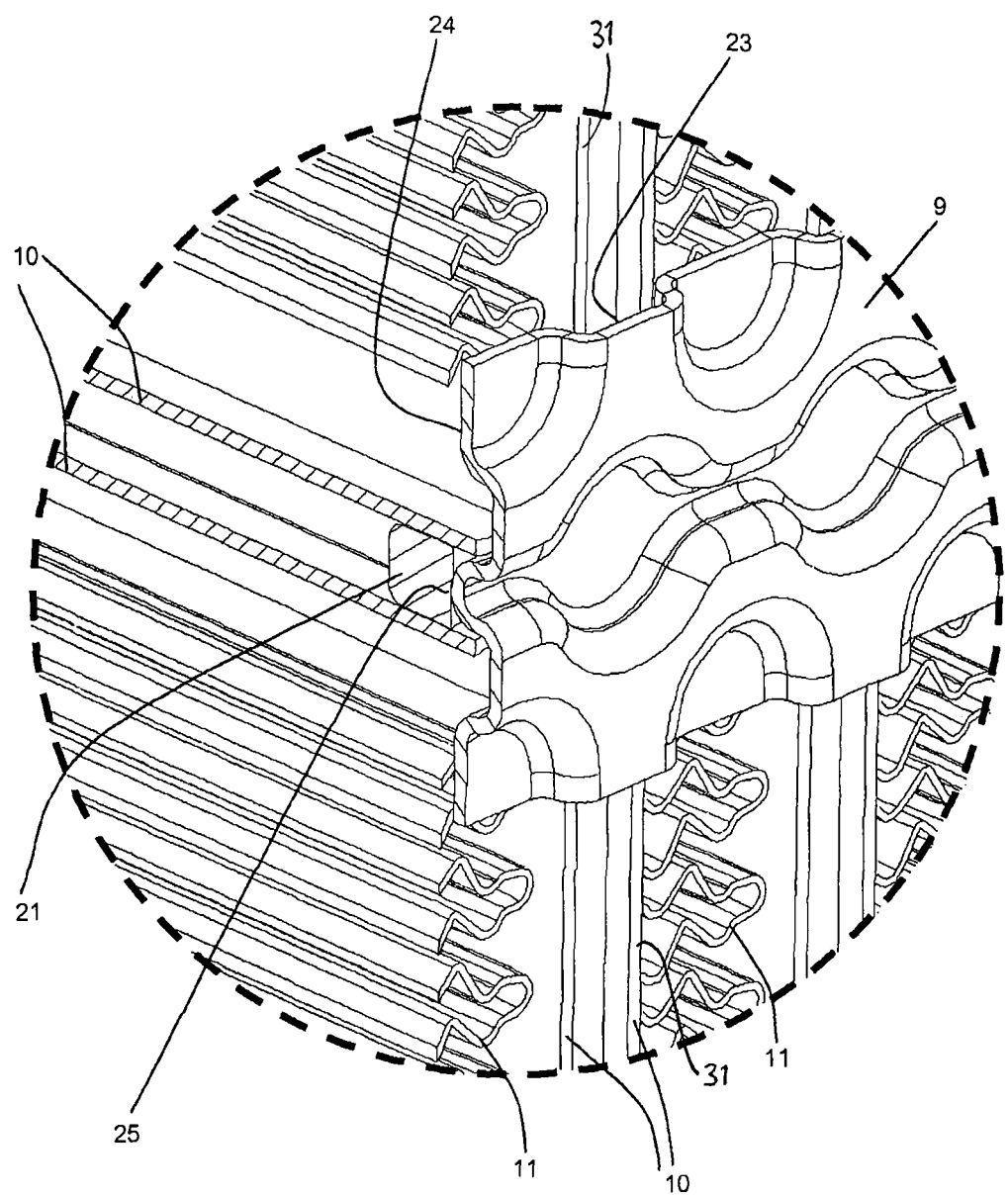
FIG. 4 is a detail view of section IV of FIG. 3.

Referring to FIGS. 1 and 2, the heat exchanger 1 of the illustrated embodiment further includes a plurality of exhaust gas flow conduits 10 extending between the inlet tank 3 and the outlet tank 4. The exhaust gas flow conduits 10 are arranged in spaced relation to allow a flow of coolant to pass over the outer surfaces of the conduits 10 in order to facilitate the removal of heat from an exhaust gas flow passing through the conduits 10. The coolant may be directed through the heat exchanger 1 from the coolant port 6 to the coolant port 5, so as to place the coolant in a counter-current flow orientation with respect to the exhaust gas flow, or from the coolant port 5 to the coolant port 6, so as to place the coolant flow in a con-current flow orientation with respect to the exhaust gas flow. Still other flow relationships between the coolant flow and exhaust gas flow are possible, and fall within the spirit and scope of the present invention.

The coolant that is directed over the exhaust gas flow conduits 10 to remove heat from the exhaust gas may be any liquid or gaseous flow that is at a lower temperature than the flow of exhaust gas. For example, the coolant may be a typical engine coolant such as ethylene glycol, propylene glycol, water, or some mixture thereof. In some embodiments, the coolant may be a refrigerant or a working fluid for a Rankine cycle. In other embodiments the coolant may be air.

Although the illustrated embodiment depicts eighteen exhaust gas flow conduits 10 arranged in two rows of nine conduits each, it should be understood that both the number of rows and the number of conduits within each row may be greater or less than the number shown, depending on the specific intended application.

Figure 5:
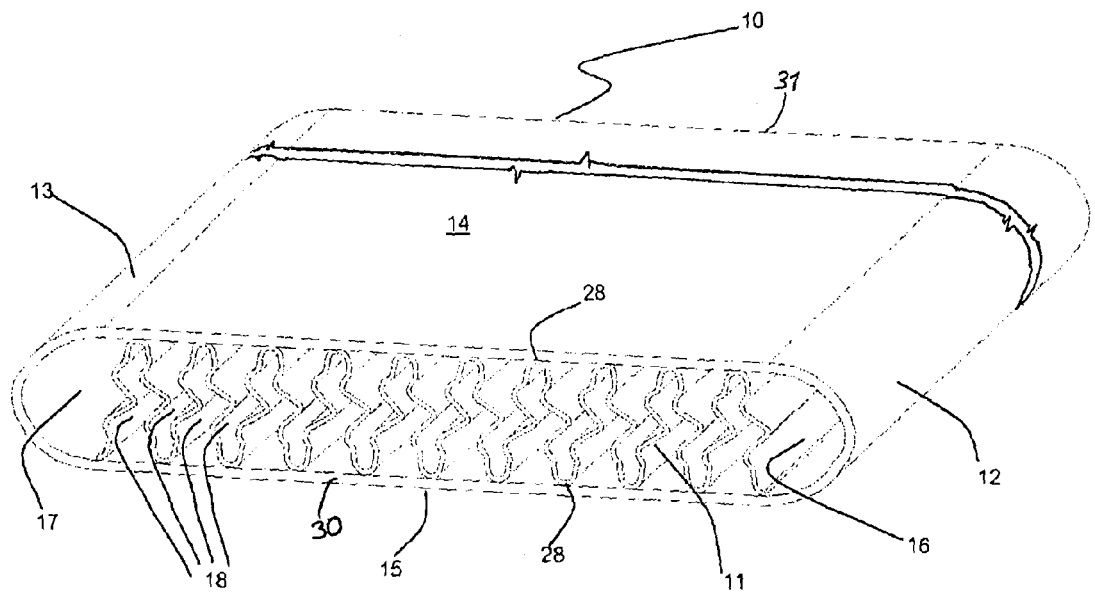
FIG. 5 is a perspective view of an exhaust gas flow conduit from the embodiment of FIG. 1.

FIG. 5 depicts one of the exhaust gas flow conduits 10 in greater detail. The exhaust gas flow conduit 10 includes a first end 30 adjacent the inlet port 7 and a second end 31 adjacent the outlet port 8. The exhaust gas flow conduit 10 in the illustrated embodiment also has a first arcuately shaped narrow side 12, a second arcuately shaped narrow side 13 opposite the first narrow side 12, and substantially flat broad sides 14, 15 extending between the narrow sides 12, 13 to form an enclosed flow conduit. The arcuate shape of the narrow sides 12, 13 can provide enhanced durability to the heat exchanger 1 by eliminating the geometric stress risers that may occur at the corners of a rectangular shaped flow conduit. In other embodiments, however, flow conduits 10 having other shapes (e.g., an arcuately shaped first narrow side and a generally rectangularly-shaped second narrow side, generally rectangular first and second narrow sides, first and/or second narrow sides having triangular or other faceted shapes, and the like) may alternatively be employed.

The exhaust gas flow conduit 10 comprises a first channel 16 adjacent the first arcuately shaped narrow side 12, and a second channel 17 adjacent the second arcuately shaped narrow side 13. The first and second channels 16, 17 extend between the first end 30 and the second end 31 of the exhaust gas flow conduit 10 to direct exhaust gas from the inlet port 7 to the outlet port 8. The exhaust gas flow conduit 10 further comprises a plurality of third channels 18 located between the channels 16, 17. The third channels 18 extend between the first end 30 and the second end 31 of the exhaust gas flow conduit 10 to direct exhaust gas from the inlet port 7 to the outlet port 8. The plurality of third channels 18 may be at least partially defined by a convoluted fin structure 11 located within the exhaust gas flow conduit 10. In some embodiments, part or all of the fin structure 11 is defined by a separate element (e.g., an "insert") received within the gas flow conduit 10. In some embodiments, it may be advantageous for the convoluted fin structure 11 to include multiple crests 28 that are bonded to either or both of the broad flat sides 14, 15 by, for example, by brazing.

Figure 6:
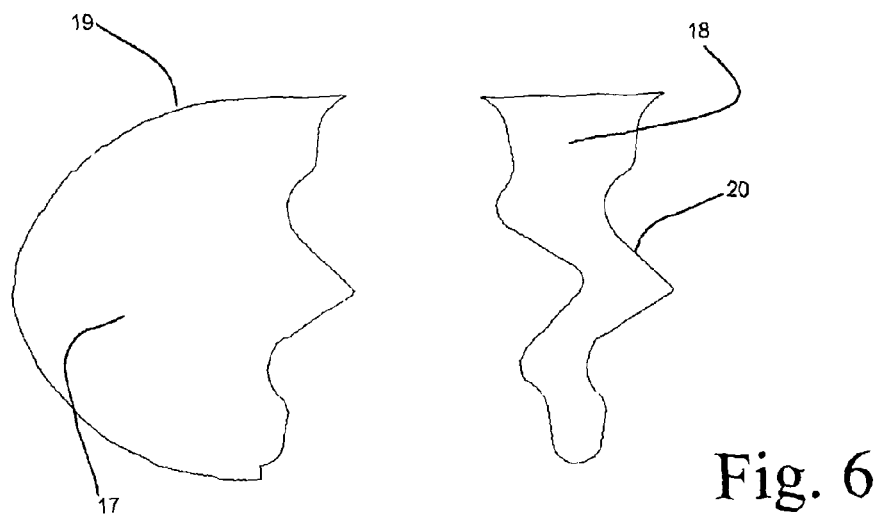
FIG. 6 is a comparison of flow areas within the exhaust gas flow conduit of FIG. 5.

FIG. 6 depicts the channels 17, 18 side-by-side at a common scale for comparison. It should be readily apparent from inspection of FIG. 6 that the cross-sectional area of the channel 18 is substantially less than the cross-sectional area of the channel 17. In the illustrated embodiment, the ratio of the cross-sectional area of channel 18 to the cross-sectional area of channel 17 is about 0.36. In other embodiments, the ratio of the cross-sectional area of channel 18 to the cross-sectional area of channel 17 can be in a range from about 0.30 to about 0.50. Other differences between the cross-sectional area of the channel 16 and/or 17 and the intermediate channels 18 are possible in other embodiments, including those with convoluted fin structures 11 of different sizes and shapes, flow conduits 10 having different narrow side shapes, and the like.

In performing calculations of the heat transfer behavior and/or pressure drop of a fluid flowing through a channel, it is useful to consider the hydraulic diameter of the channel as a characteristic length. The hydraulic diameter is conventionally defined as being equal to four times the ratio of the channel's flow area to its wetted perimeter. For the channels 17, 18 of FIG. 6, the wetted perimeters are indicated as 19 and 20, respectively. In the illustrated embodiment, the ratio of the hydraulic diameter of the third channel 18 to the hydraulic diameter of the second channel 17 is about 0.40. In other words, the hydraulic diameter of the second channel 17 is approximately two and a half times greater than the hydraulic diameter of each of the plurality of third channels 18 in the illustrated embodiment. In the other embodiments, the ratio of the hydraulic diameter of the third channel 18 to the hydraulic diameter of the second channel 17 can be in a range from about 0.30 to about 0.50. In yet other embodiments, the ratio of the hydraulic diameter of the third channel 18 to the hydraulic diameter of the second channel 17 can be less than about 0.75. It should be understood that the first channel 16 of the illustrated embodiment, while not shown in FIG. 6, is similar in both flow area and hydraulic diameter to the second channel 17, and has approximately the same ratios of flow area and hydraulic diameter to the channels 18.

It should be readily appreciated by those having skill in the art of heat exchangers that the hydraulic diameter of the plurality of third channels 18 will be reduced as the center-to-center spacing of the crests 28 of the convoluted fin structure 11 is decreased. Such a decrease may be seen as advantageous to the thermal performance of the heat exchanger 1, since it will increase the amount of convective surface area exposed to the fluid passing through the flow conduit 10, albeit at the expense of an increase in the pressure drop imposed on the fluid. The hydraulic diameter of the first and second channels 16, 17 are not, however, affected by such a change in the center-to-center spacing, since the arcuate profile of the narrow sides 12, 13 preclude the extension of the convoluted insert 11 into the channels 16, 17.

Figure 8:
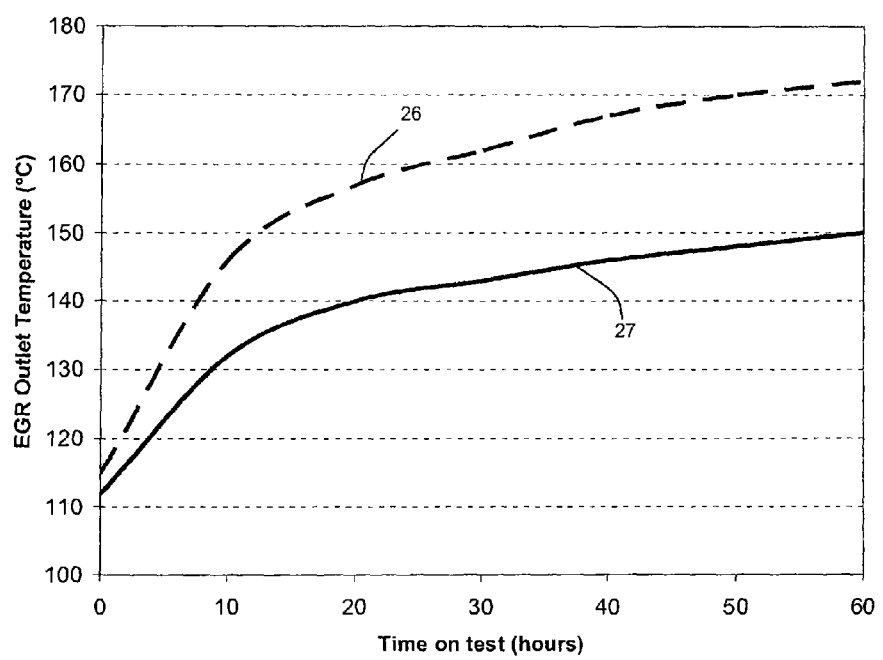
FIG. 8 is a graph depicting performance test results of an EGR cooler according to an embodiment.

The inventors have found that when the aforementioned ratio of the hydraulic diameter of channels 18 to that of channels 16, 17 is decreased to be substantially smaller than a value of 1.0, then the heat exchanger 1 can be predisposed to have a high susceptibility to performance degradation due to fouling. This can be seen by the dashed line 26 in FIG. 8, which depicts test data of an EGR cooler having exhaust flow conduits 10 as depicted in FIGS. 5 and 6. The EGR cooler was tested at normal operating conditions by passing exhaust flow from an internal combustion engine through the exhaust gas flow conduits, with a flow of coolant removing heat from the exhaust flow as it passes through the exhaust flow conduits 10. The exhaust gas flow enters the exhaust gas flow conduits 10 at a temperature of approximately 600° C., as is typical for EGR coolers in vehicular applications. The graph in FIG. 8 shows the temperature of the cooled exhaust flow exiting the exhaust gas flow conduits over the duration of the test. As evidenced by the graph, the heat transfer performance of the EGR cooler decreases with increased time on test, due to fouling of the heat exchange surfaces exposed to the exhaust gas. The resulting increase in the temperature of the exhaust gas exiting the exhaust gas flow conduits 10 is not desirable for EGR coolers.

Test data such as that shown by the dashed line 26 can be used to determine an appropriate fouling factor for use in the sizing of a heat exchanger, such as for example an EGR cooler, for specific applications. Such a fouling factor may be used to ensure that the heat exchanger is sized to deliver acceptable performance even when operated in a foreseeable fouled condition.

Although not wishing to subscribe to a particular theory regarding fouling and the impact of fouling upon a heat exchanger, it is believed that at least some amount of the observed performance degradation due to fouling may be the result of a non-preferential redistribution of exhaust gas flow occurring as the surfaces become fouled. Specifically, as a layer of particulate material forms on the surfaces of the convoluted fin structure 11, the percentage reduction in flow area of the plurality of third channels 18 will be substantially greater than the percentage reduction in flow area of the first and second channels 16 and 17, due to the smaller ratio of flow area to wetted (e.g., fouled) perimeter of the channels 18, as evidenced by their smaller hydraulic diameter. The reduction in flow area results in a corresponding reduction in hydraulic diameter, both of which contribute to an increased resistance to flow through the channels (i.e. increased pressure drop). Since the channels 16, 17, 18 are hydraulically in parallel, the pressure drop across all channels is identical, and the distribution of exhaust gas flow between the channels will adjust as needed.

Accordingly, the percentage of total exhaust gas flow that passes through the first and second channels 16, 17 will increase as the surfaces foul and the ratio of the hydraulic diameter of the third channels 18 to the hydraulic diameter of the first and second channels 16, 17 decreases. It is believed that the redistribution of flow to balance the pressure drops through the channels results in a reduction of the flow velocity through the third channels 18 and an increase in the flow velocity through the first and second channels 16, 17. It is well known that the rate of fouling is inversely proportional to flow velocity. While not wishing to be bound by theory, the inventors believe that a positive feedback mechanism is created, whereby fouling leads to redistribution of flow away from the third channels 18, which leads to increased fouling of those channels 18, leading to additional redistribution of flow, and so on, until a stable, fouled operating condition is achieved wherein a substantial portion of the total exhaust gas flow is directed through the first and second channels 16, 17.

Figure 7:
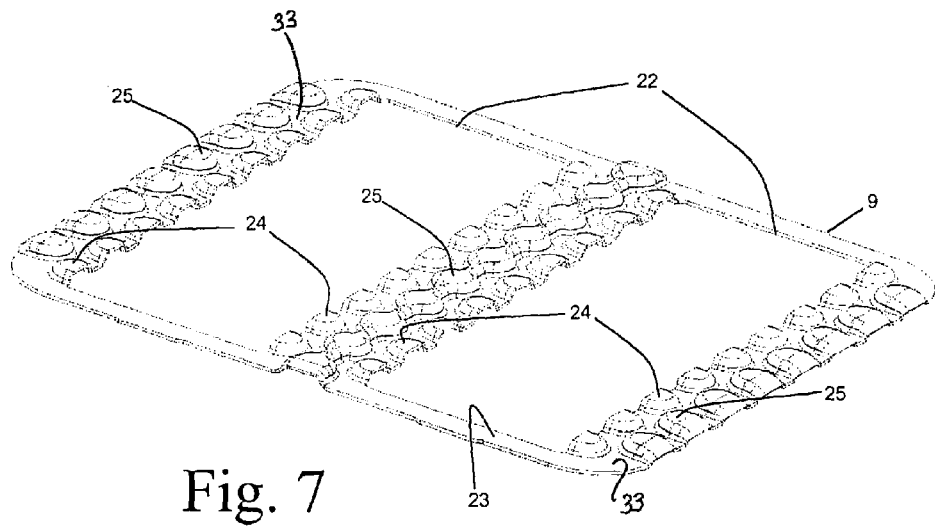
FIG. 7 is a perspective view of a flow blocking plate from the embodiment of FIG. 1.

In order to improve the thermal performance of the heat exchanger 1 when operating in a fouled condition, the heat exchanger of FIGS. 1-4 includes a flow blocking plate 9 positioned at the outlet end 31 of the exhaust gas flow conduits 10. The flow blocking plate 9 includes apertures 22 (FIG. 7) aligned with at least some of the third plurality of channels 18 of at least some of the exhaust gas flow conduits 10. The flow blocking plate 9 of the illustrated embodiment has apertures 22 that are common to channels 18 of multiple exhaust gas flow conduits 10. However, in some embodiments, each exhaust gas flow conduit 10 may have its own aperture 22.

With continued reference to the illustrated embodiment, the flow blocking plate 9 includes a face 23 that may be advantageously positioned adjacent one of the ends 30, 31 (e.g., the outlet end 31) of the exhaust gas flow conduits 10. The ends 31 penetrate through and are received by a header 21 (FIG. 4) of the heat exchanger 1. As can be best seen in FIG. 4, these ends 31 can extend for a certain portion beyond the surface of the header 21, due to, for example, manufacturing and assembly tolerances.

Also included in the illustrated flow blocking plate 9 is a plurality of surfaces 25 that are offset from the face 23. In some embodiments, each of the surfaces 25 is defined by a raised surface of the flow blocking plate 9 (when viewed in the orientation of FIG. 7, for example). The raised surfaces 25 can have any shape desired. In the illustrated embodiment, the raised surfaces 25 are shaped as plateaus that are substantially planar and flat. In other embodiments, the raised surfaces 25 may be shaped as pointed peaks, as rounded peaks, or as a combination of different shapes. The surfaces 25 can directly couple or mate against the face of the header 21, and the flow blocking plate 9 can be at least partially joined to the header 21 at one or more of the surfaces 25, such as by welding, brazing, or other joining processes.

The flow blocking plate 9 further includes a plurality of surfaces 24 offset from the face 23 and positioned so as to be received within the exhaust gas flow conduits 10 near (i.e., adjacent) the arcuate narrow sides 12, 13. In some embodiments, the surfaces 24 are also adjacent an end of the convoluted fin structure 11. This provides a tortuous flow path for exhaust gas flowing through the first and second channels 16, 17 of each of the exhaust gas flow conduits 10. Thereby, exhaust gas flow is directed through those channels (e.g., the third channels 18) that are in alignment with the apertures 22. In some embodiments, all or substantially all of the exhaust gas flow is directed in this manner. As with the raised surfaces 25 described above, each of the surfaces 24 is defined by a raised surface of the flow blocking plate 9 (when viewed in the orientation of FIG. 7, for example). In the illustrated embodiment, the raised surfaces 24 are shaped as plateaus. In other embodiments, the surfaces 24 may be shaped as pointed peaks, as rounded peaks, or as a combination of different shapes.

The flow blocking plate 9 of the illustrated embodiment is a single flow blocking plate 9 adapted to block multiple channels 16, 17 of the flow conduits 10. In some embodiments, two or more flow blocking plates 9 can be located at the ends 30, 31 of a bundle of flow conduits for achieving this same purpose. By way of example only, the flow blocking plate 9 shown in FIG. 7 can be replaced with two side-by-side flow blocking plates 9 that together define the same shape as that shown in FIG. 7. The flow blocking plate 9 of FIG. 7 can be constructed of any number of flow blocking plates, each of which are shaped and positioned to block (e.g., cover) two or more channels 16, 17. In some embodiments, a flow blocking plate 9 is shaped and positioned to block two or more channels 16, 17 and/or to extend between exhaust gas flow conduits 10 in two or more locations. Also, such a flow blocking plate 9 can block only channels 16, 17 located at a common narrow side 12, 13 of two or more adjacent exhaust gas flow conduits 10, and/or can block channels 16, 17 at both narrow sides 12, 13 of the same exhaust gas flow conduit 10. Depending upon the shape and size of the flow blocking plate 9, any number and combination of channels 16, 17 in a bundle of exhaust gas flow conduits 10 can be blocked by a flow blocking plate 9. Similarly, depending upon the shape and size of the flow blocking plate 9, such flow blocking plates 9 can extend to any number and combination of locations between exhaust gas flow conduits 10.

Although the flow blocking plate 9 of the illustrated embodiment covers and blocks channels 16, 17 at both narrow sides 12, 13 of each exhaust gas flow conduit 10 of the heat exchanger 1, it should be noted the flow blocking plate 9 can cover and block any subset of the channels 16, 17, based at least in part upon the shape of the flow blocking plate 9 selected.

With continued reference to the flow blocking plate 9 of the illustrated embodiment, the surfaces 24, 25 of the flow blocking plate 9 are connected to one another by webs 33 of material integral to the surfaces 24, 25. These webs of material 33 connect all of the surfaces 24, 25 together in the illustrated embodiment. In other embodiments, any other number, shape, and location of webs 33 can be used to connect any number of surfaces 24 and/or 25 together to at least partially define the flow blocking plate 9. Such webs 33 can, for example, extend between and connect adjacent surfaces 24 of the flow blocking plate 9 covering the channels 16, 17 at the narrow sides 12, 13 of the exhaust gas flow conduits 10. The webs 33 can also extend between and connect adjacent surfaces 25 of the flow blocking plate 9 located between adjacent exhaust gas flow conduits 10, and/or can extend between and connect each of these types of surfaces 24, 25.

As described above, each of the surfaces 24, 25 of the illustrated flow blocking plate embodiment has a respective raised portion. In this regard, the surfaces 24, 25 can each be defined by a projection having any shape suitable for insertion within ends of the channels 16, 17 or in locations between the exhaust gas flow conduits 10. In other embodiments, any number of the surfaces 24 and/or 25 can be substantially flat, and need not necessarily extend into such locations to perform the functions described herein. For example, some or all of the surfaces 24 of the flow blocking plate 9 can be substantially flat, and can be positioned to cover the narrow sides 12, 13 of the channels 16, 17. In still other embodiments, any number of the surfaces 24 can instead be defined by a recess in the flow blocking plate 9 within which one of the narrow sides 12, 13 of an exhaust gas flow conduit 10 is received to cover and block the corresponding channel 16, 17 of the exhaust gas flow conduit 10.

In those embodiments in which surfaces 24 of the flow blocking plate 9 extend into the channels 16, 17, or in which the surfaces 24 of the flow blocking plate 9 receive the narrow sides 12, 13 adjacent the channels 16, 17, the surfaces 24 can each have a shape corresponding to the interior or exterior shape of the narrow sides 12, 13, respectively. Matching the shape of the surfaces 24 in this manner can improve the ability of the flow blocking plate 9 to perform its function.

The flow blocking plate 9 can be manufactured in a number of different manners, such as by stamping, molding, machining, and the like. In some embodiments, the flow blocking plate 9 can be produced from a single sheet of material having a constant or substantially constant thickness, and that is formed in any suitable manner to the final shape desired for installation on the exhaust gas flow conduits 10. Accordingly, the surfaces 24, 25 described herein can be created by being forced out of plane with respect to surrounding surfaces (e.g., webs 33) of the sheet of material.

Although the illustrated embodiment includes the flow blocking pate at the exhaust gas outlet end 31 of the flow conduits 10, the same or similar effect can be achieved by placing a flow blocking plate 9 at the inlet end 30 of the flow conduits 10 in place of or in addition to the flow blocking plate 9 at the outlet end 31.

Impeding the ability of exhaust gas to bypass the third channels 18 in favor of the first and second channels 16, 17 with the flow blocking plate 9 helps maintain the thermal performance of the heat exchanger 1. In particular, if the heat exchanger 1 did not include the flow blocking plate 9, the thermal performance may be reduced due to the feedback mechanism described above. In order to evaluate the benefit derived from the flow blocking plate 9, a heat exchanger identical to the one used to generate the test data of dashed line 26, excepting the addition of a flow blocking plate 9, was tested in an identical manner. The results of that test are indicated by the solid line 27 in FIG. 8. As evidenced by the graph, the heat exchanger 1 with the flow blocking plate 9 showed an improved performance in the clean condition (i.e. at 0 hours time on test). As the heat exchangers fouled over the course of the test, however, the heat exchanger 1 with the flow blocking plate 9 showed a pronounced improvement in thermal performance over the heat exchanger without a flow blocking plate. Surprisingly, heat exchangers operating in the fouled condition produced an almost identical pressure drop, suggesting that the third channels 18 in the heat exchanger 1 with the flow blocking plate 9 experienced less flow channel constriction due to fouling than did the flow channels in the heat exchanger without a flow blocking plate.

The addition of a flow blocking plate 9 may especially provide a desirable improvement in the heat transfer performance of an exhaust gas heat exchanger when the ratio of the hydraulic diameter of the third channels 18 to the hydraulic diameter of the first and second channels 16, 17 is less than 0.75. In some embodiments, the ratio may be less than 0.5 in order to provide an especially desirable improvement in heat transfer performance in certain applications.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the heat exchanger 1 illustrated in FIGS. 1-4 has an outer casing 2 within which the plurality of flow conduits 10 are located (and partially covered by one or more flow blocking plates 9, as described above), the exhaust gas inlet tank 3, the exhaust gas outlet tank 4, and the exhaust flow inlet and outlet ports 7, 8. It will be appreciated that in other applications, other configurations of the heat exchanger 1 are possible while still utilizing features of the present invention, such as heat exchangers having different shapes and sizes, heat exchangers having more than one exhaust gas inlet tank and/or outlet tank, and heat exchangers having more than one exhaust flow inlet ports and/or outlet ports. As another example, the heat exchanger 1 can have any number of flow blocking plates 9 desired, each of which can block fluid flow through the plurality of flow conduits 10.

Figure 9:
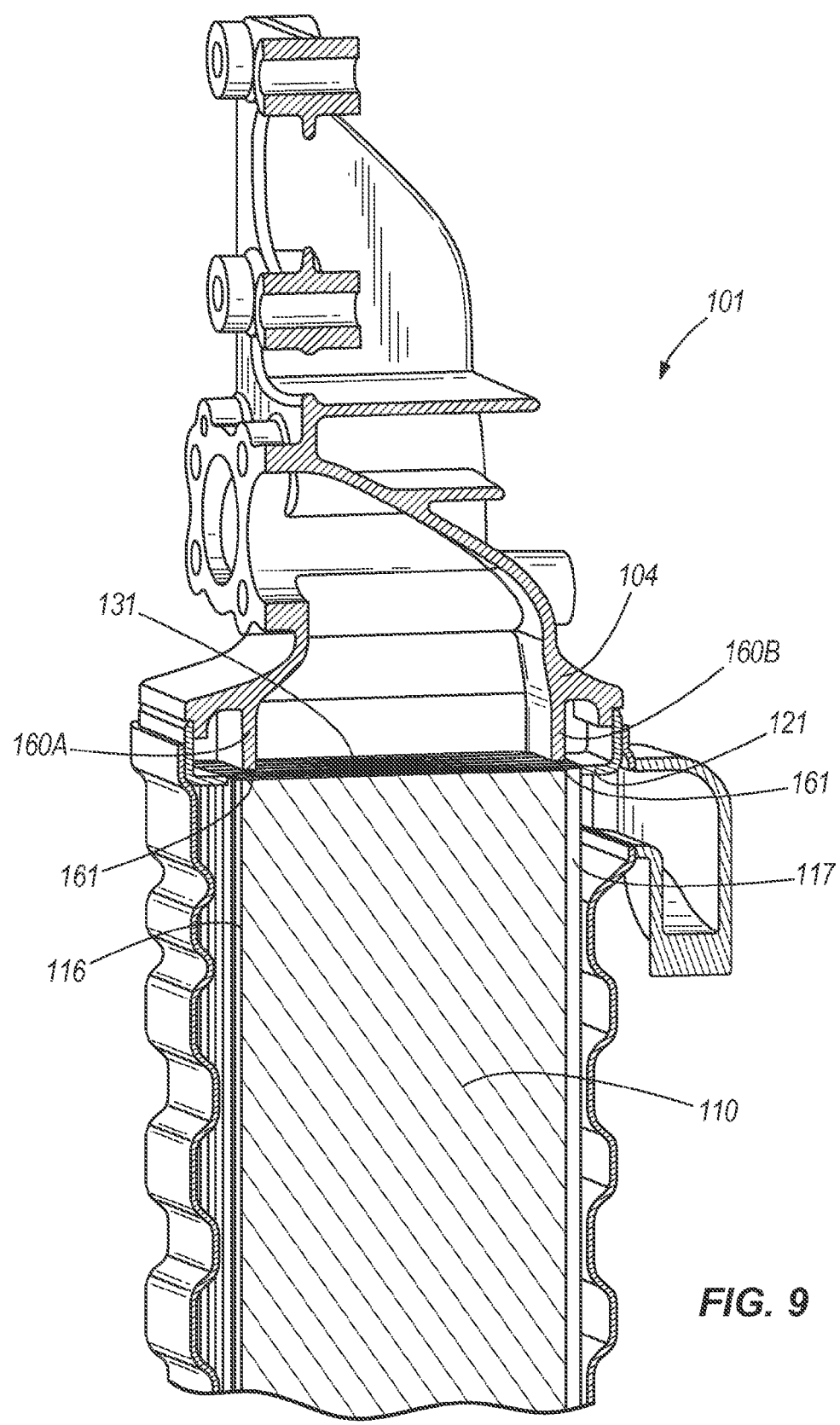
FIG. 9 is a partial cross-sectional view of an EGR cooler according to another embodiment.

FIG. 9 illustrates an EGR cooler 101 according to another embodiment. The EGR cooler 101 of FIG. 9 includes features similar to the EGR cooler 1 of FIGS. 1-7 and like components have been given like reference numbers, plus 100 and only differences between the EGR coolers 1 and 101 will be discussed in detail. In this embodiment, tank 104 is formed as a pressure die-cast product. Said collecting tank 104 however has two additional integrated inner walls 160A and 160B which extend in the region of the first channel 116 and the second channel 117, respectively. The inner walls 160A and 160B are integrated such that the walls 160A and 160B are integrally formed with the tank 104 as a single component. Free edges 161 of the walls 160A and 160B close off the bypass channels 116 and 117 because said edges 161 approximately rest on or contact the flat tube ends or, as shown, are arranged at a minimal distance from the flat tube ends. Although the walls 160A and 160B are illustrated as being part of the outlet tank 104, in other embodiments, the inlet tank can include the walls instead of the outlet tank and in yet other embodiments, both the inlet and outlet tanks can include the walls 160A and 160B to close off or inhibit exhaust gas flow through the channels 116 and 117.

Figure 10:
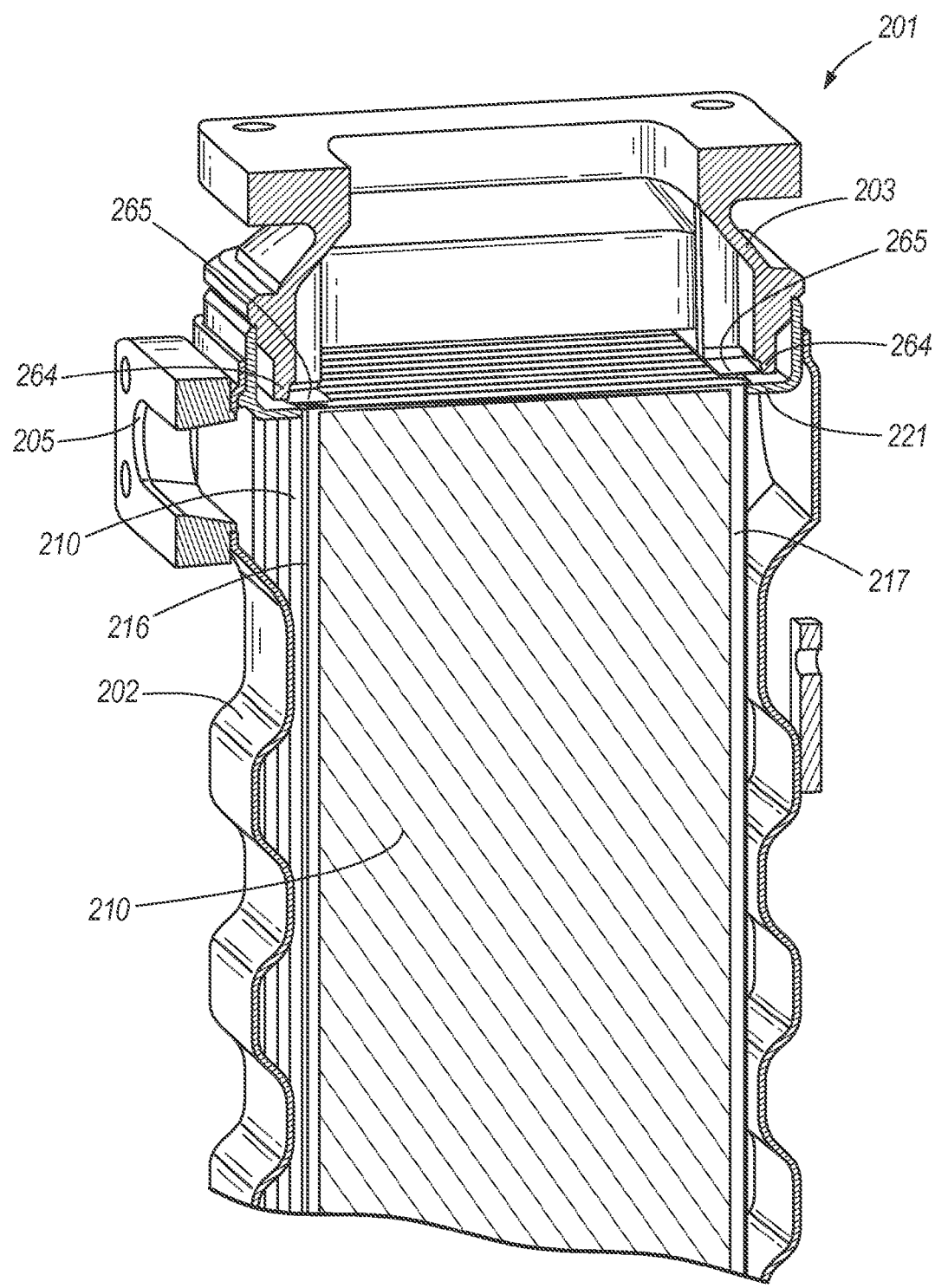
FIG. 10 is a partial cross-sectional view of an EGR cooler according to another embodiment.

FIG. 10 illustrates an EGR cooler 201 according to another embodiment. The EGR cooler 201 of FIG. 10 includes features similar the EGR coolers 1 and 110 and like components have been given like reference numbers in the 200 series and only differences between the EGR coolers 1, 101, and 201 will be discussed in detail. The EGR cooler 201 includes a relatively thick wall 264 of the tank 203 that is formed with an inwardly directed shelf 265 which leads to a thinner lower wall part. The lower wall part, or part which is situated further toward the inside, performs the bypass closure function to close off or inhibit exhaust gas flow through the channels 216 and 217, and at the top or outer wall part, the collecting tank 203 is fastened to the edge of the tube plate 221.

Figure 11:
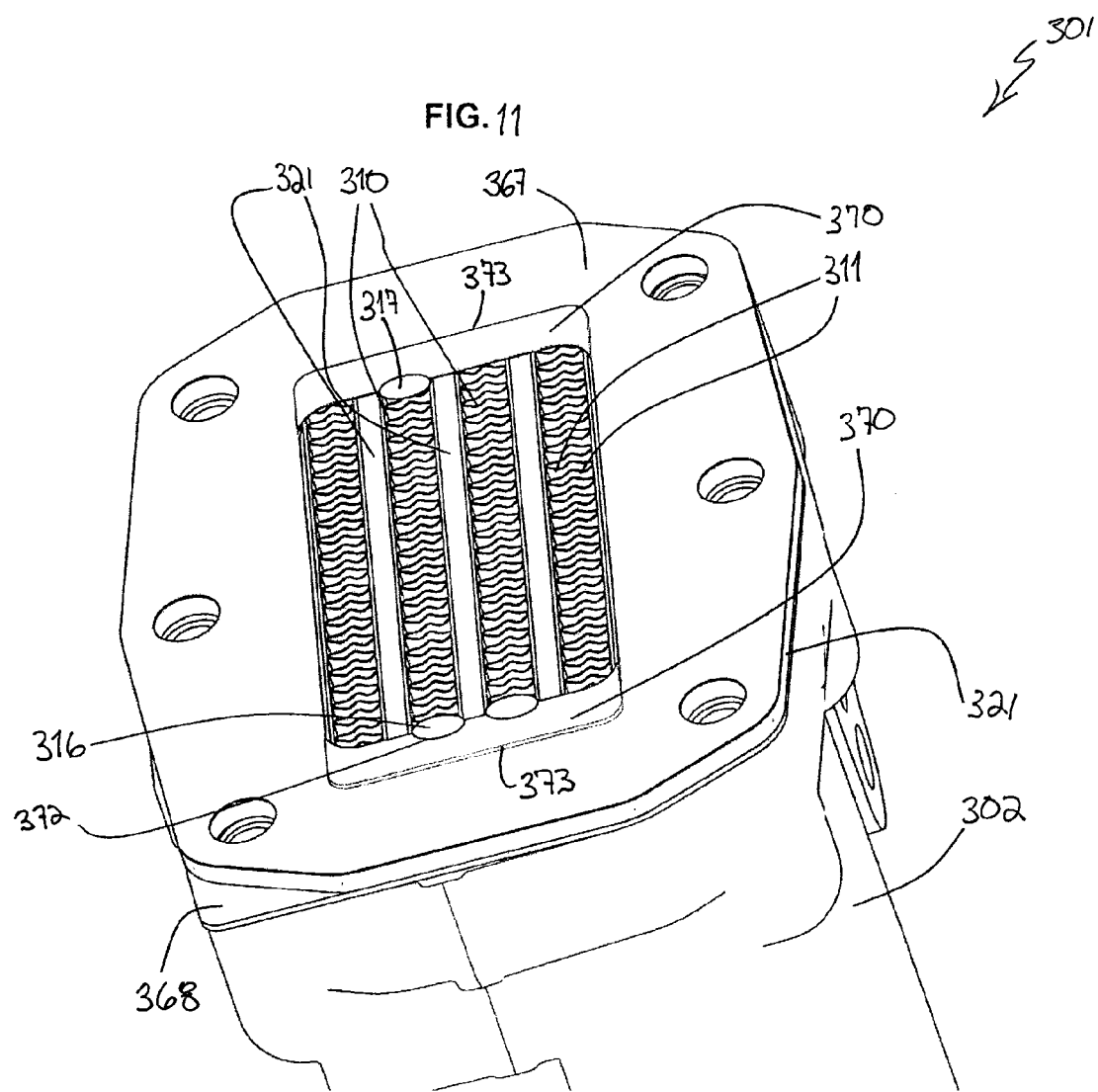
FIG. 11 is a perspective view of an end portion of an EGR cooler according to another embodiment.
Figure 12:
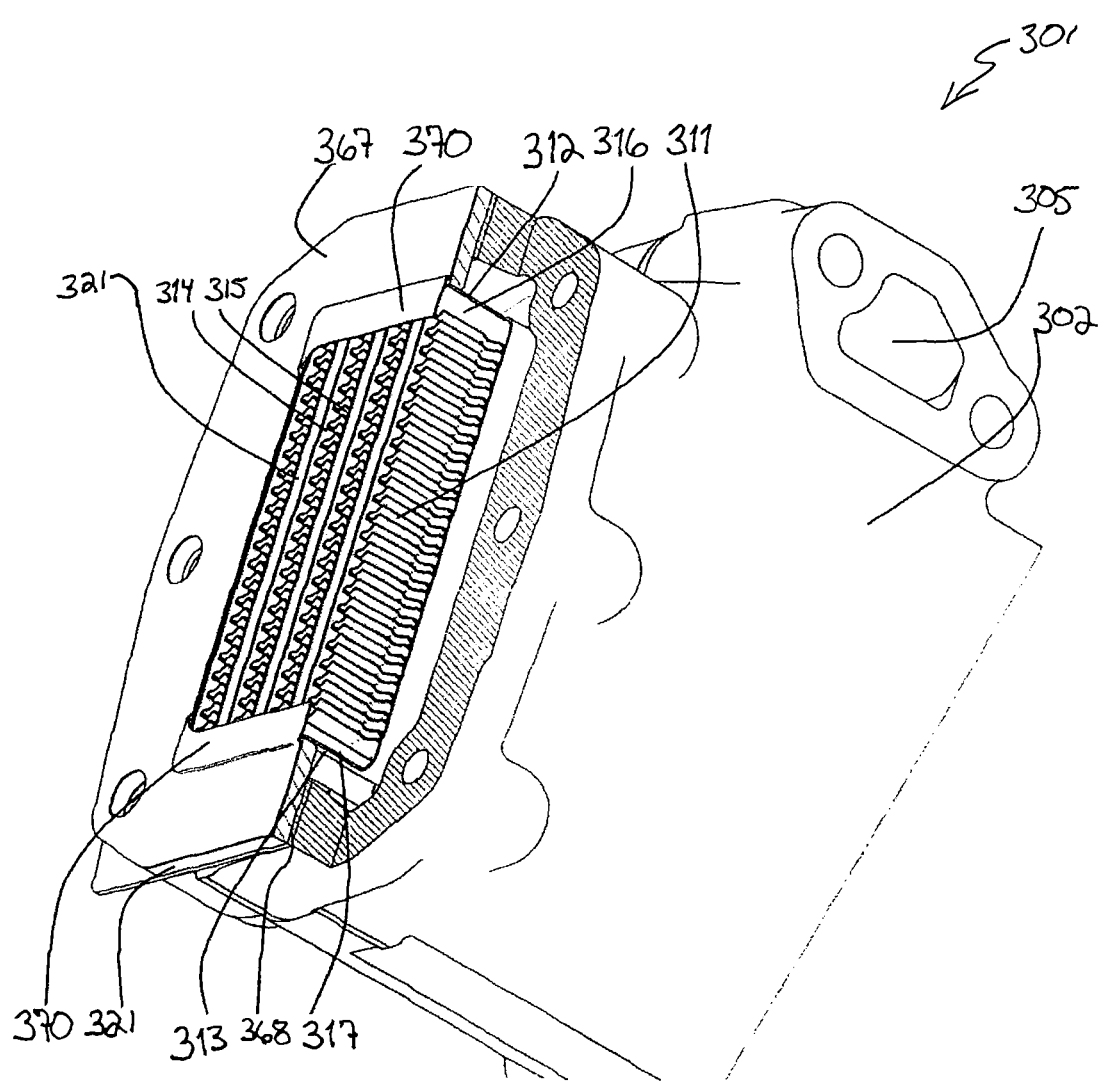
FIG. 12 is a partial cross-sectional view of the end portion of the EGR cooler of FIG. 11.
Figure 13:
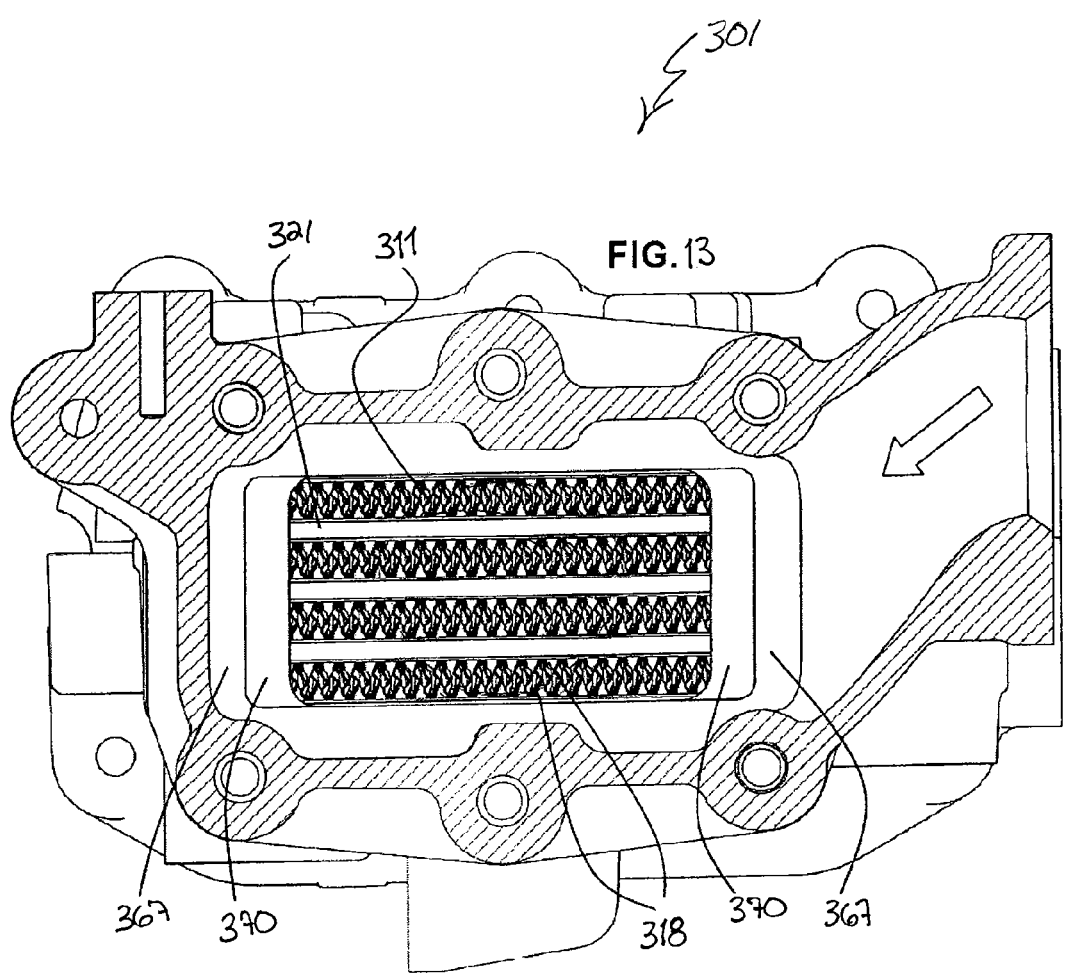
FIG. 13 is a cross-sectional view of the end portion of the EGR cooler of FIG. 11.
Figure 14:
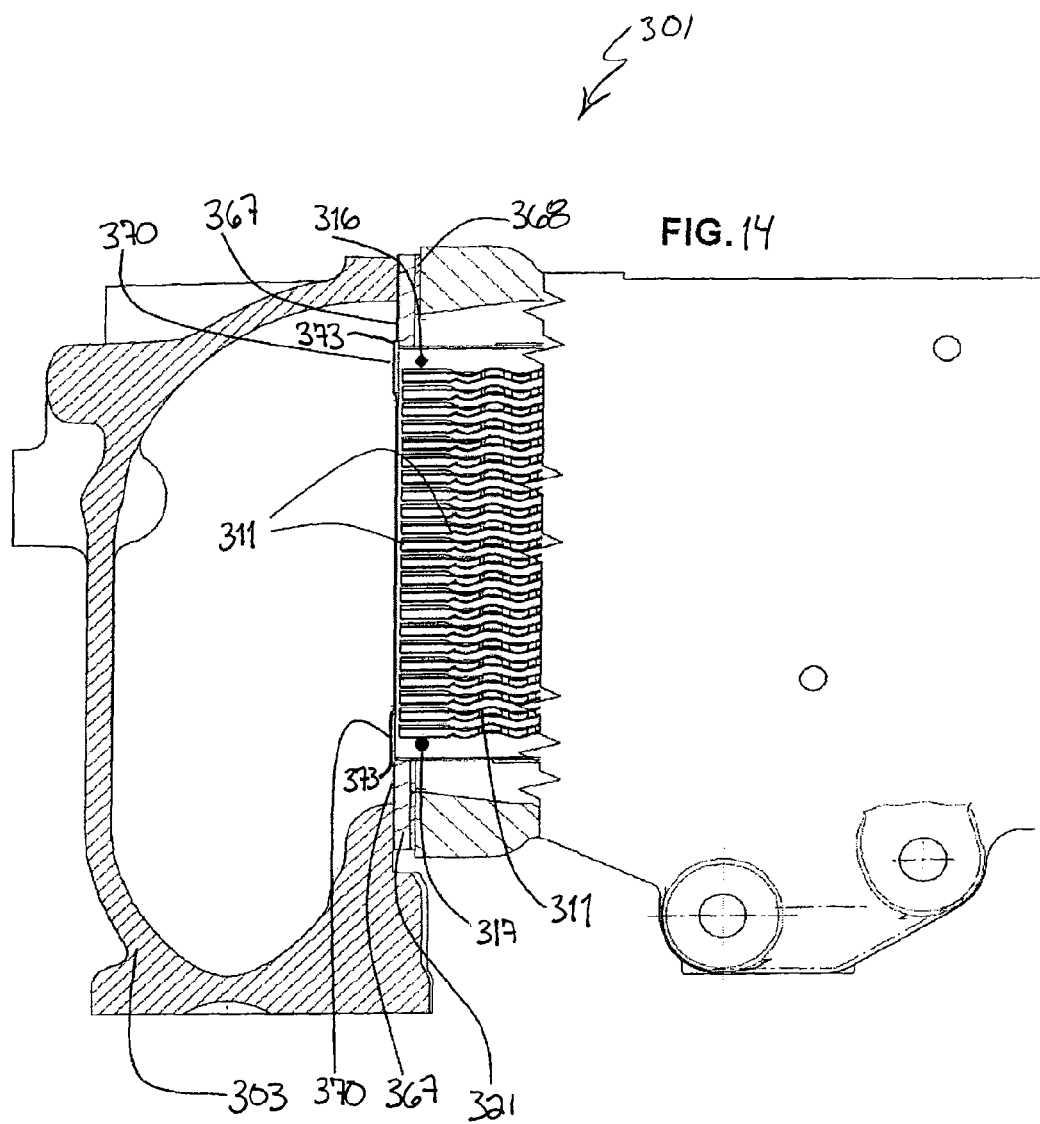
FIG. 14 is a partial cross-sectional view of the end portion of the EGR cooler of FIG. 11.
Figure 15:
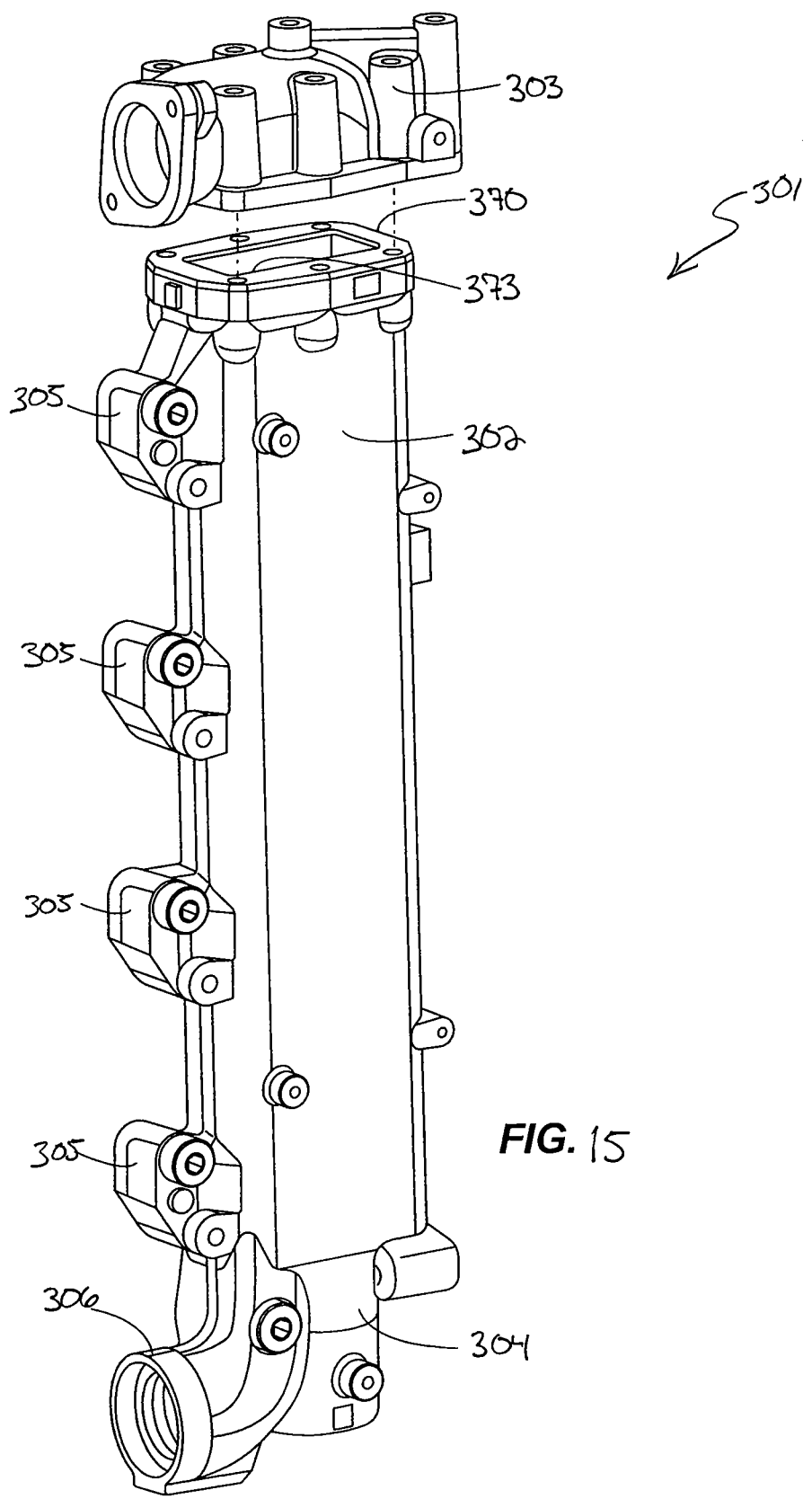
FIG. 15 is a partially exploded view of the EGR cooler of FIG. 11.

FIGS. 11-15 illustrate an EGR cooler 301 according to another embodiment. The EGR cooler 301 includes features similar the EGR coolers 1, 110 and 210 and like components have been given like reference numbers in the 300 series and only differences between the EGR coolers 1, 101, 201, and 301 will be discussed in detail. The EGR cooler 301 includes a seal 367 that is situated between the tube plate 321 and the collecting tank 303. In this embodiment, there is also a second seal 368 between the tube plate 321 and the open end of the housing 302 (FIGS. 11 and 12). The seal 367 has, on two opposite sides, an extension piece 370 which does not serve to provide sealing between the said components because it projects inward beyond the seal region, that is to say it protrudes into the collecting tank 303.

The extension pieces 370 are formed as two strips which extend along the flat tube row and which rest on the flat tube ends over a short distance, specifically enough to close off the inner bypass ducts 316 and 317 which adjoin the narrow walls 312 and 313.

The extension pieces 370 extend approximately in the seal 367 plane, that is to say they have no step. In this case, the ends of the flat tubes 310 and the seal plane lie at approximately one level. As shown in FIGS. 11 and 12, there is a relatively small level difference which is overcome or compensated for by a step 373 in the seal 367, which step is situated in the region of the transition to the extension piece 370.

The extension pieces 370 may by all means also be slightly thicker and therefore more stable than the seal 367 itself in order that they can better withstand the extreme loadings.

It is preferable, but not imperative, for the seal which has the extension pieces 370 to be situated at the exhaust-gas inlet side, such that the exhaust-gas pressure can press the extension pieces 370 against the flat tube ends. It is usually adequate for the bypass ducts 316 and 317 to be substantially, that is to say not completely, closed off.

It is sought for the bypass ducts 316 and 317 to be completely or substantially closed off in all the tubes 310. Substantial closure is realized in particular if the stack, as shown here, is composed of only four flat tubes 310.

Figure 16:
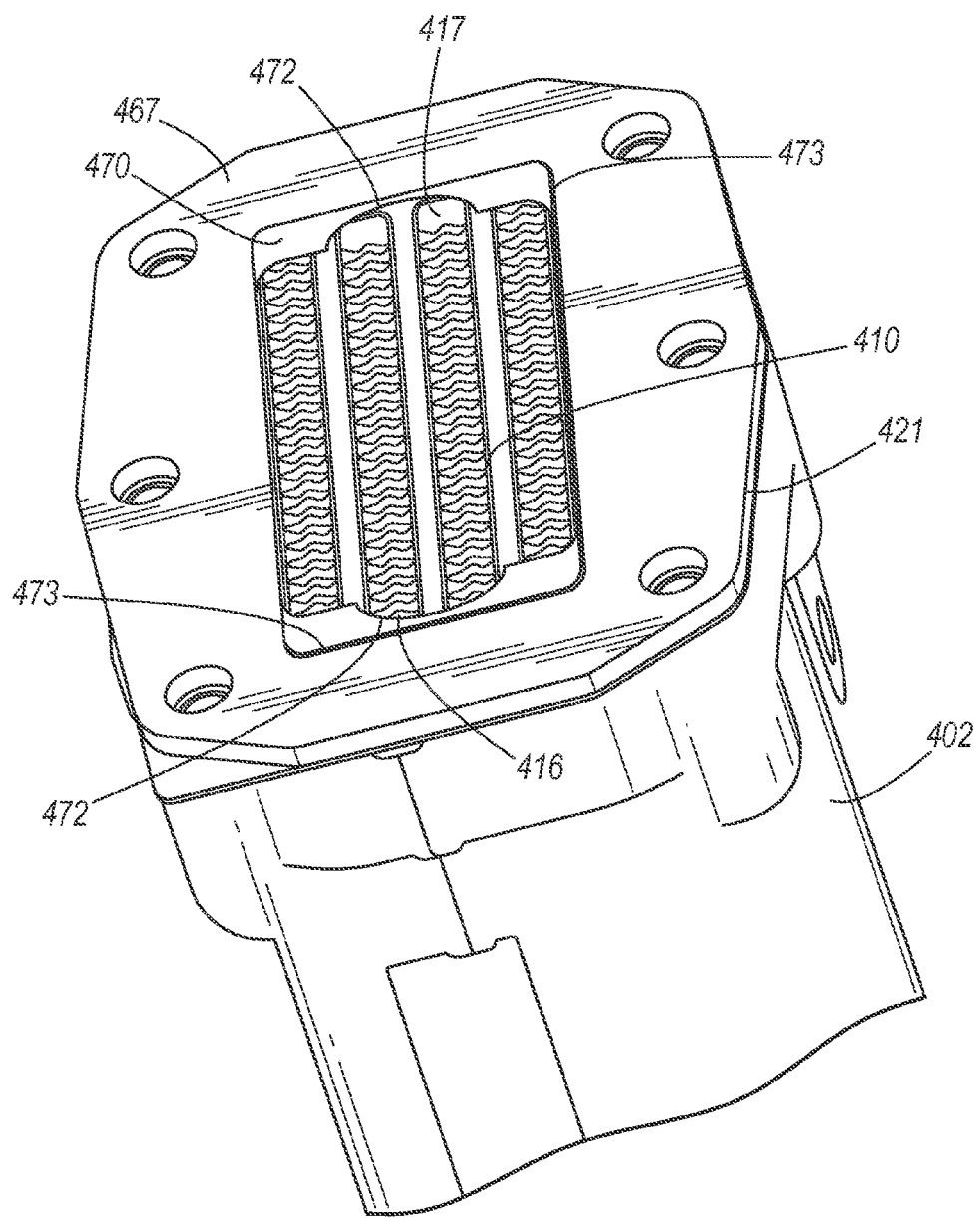
FIG. 16 is a perspective view of an end portion of an EGR cooler according to another embodiment.

In contrast thereto, it is also expediently possible, by providing cutouts 372 in the extension pieces 370, to leave the bypass ducts 316 and 317 open in selected flat tubes 310. Merely for explanation of what is meant by this, two approximately semi-circular cutouts 372 have been indicated in FIG. 11, as a result of which cutouts 372 the bypass duct 316 and 317 situated therebelow remains open. Such cutouts 372 are practically situated at multiple locations. With this measure, it is possible to attain an expedient flow distribution of the exhaust gases to the flat tubes 310 of the heat exchanger 301. In the alternative embodiment of FIG. 16, there has instead been provided (merely by way of example) a single, larger cutout 472 in each extension piece 470, which cutout leaves the bypasses 416 and 417 open in two flat tubes 410. The measure described will be better able to impart a corresponding effect in larger stacks with considerably more tubes.

The seal material is generally a soft metal (e.g., a metal bead seal) which is heat-resistant and therefore especially suitable for use in a very hot environment.

The applicant has carried out measurements which have shown that, with said first alternative of the invention, performance improvements of up to 10% can be achieved.

Figure 17:
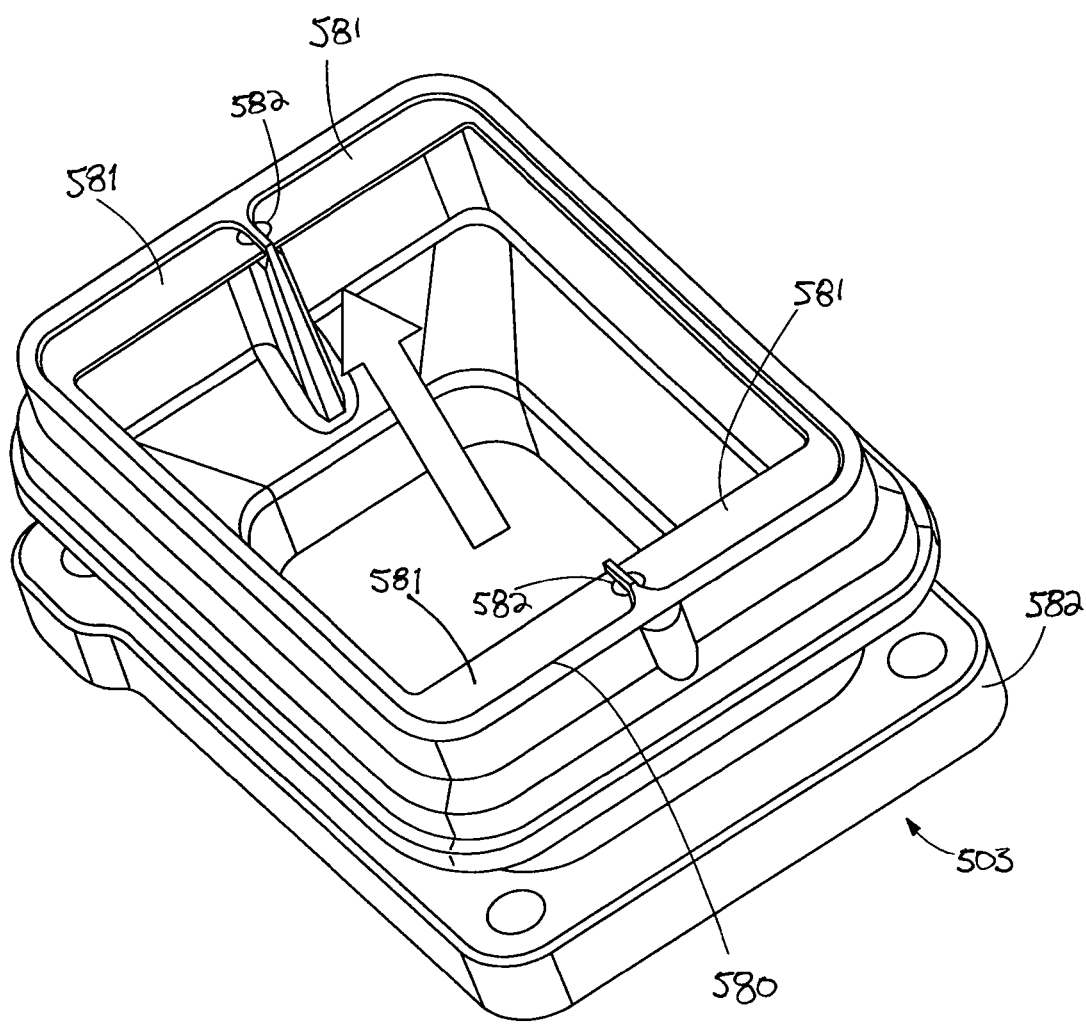
FIG. 17 is a perspective view of a portion of an EGR cooler according to another embodiment.
Figure 18:
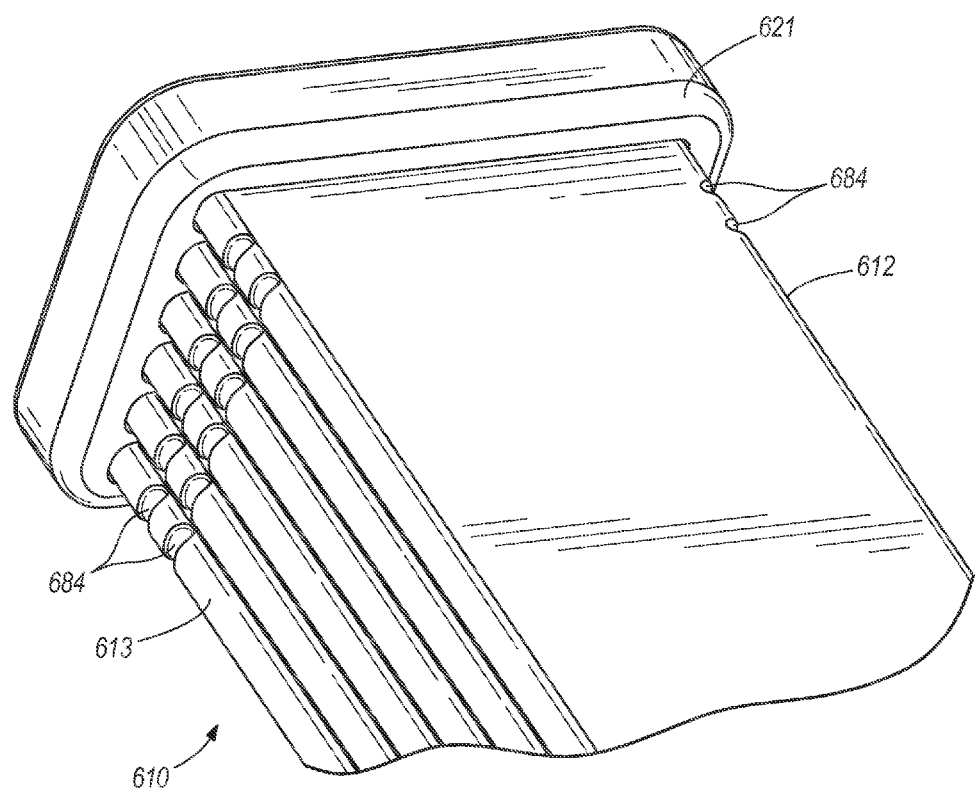
FIG. 18 is a perspective view of a portion of an EGR cooler according to another embodiment.

FIG. 17 illustrates another embodiment that shows only the inlet collecting tank 503, to the outlet-side end of which has been attached a separate component 580. Said illustrated component is a flat, frame-like closure 580 which has been for example welded in an encircling manner in the outlet-side opening of the collecting tank 503. Fastened to the closure 580 is a tube plate (e.g., the tube plate 321 of FIG. 11), in the openings of which are seated the ends of the flat tubes 310 of FIG. 11. As can be seen, the closure 580 has, at two opposite sides which correspond to those sides at which the bypasses (e.g., bypasses 316 and 317 of FIG. 11) are situated in the flat tubes, elongations 581 which project into the space of the collecting tank 503 and which ensure that the inflowing exhaust-gas flow—similarly to the situations described above—does not flow through the bypasses but rather is conducted through the above-mentioned ducts formed by the internal insert (e.g., third channels 18 of FIG. 5). The inlet collecting tank 503 has two opposite internal struts which provide a stiffening action and which run in the exhaust-gas flow direction (block arrow). The closure 580 can be held on said struts. For this purpose, the closure 580 has two slots 582 which correspond to the position of the struts, such that a part of the edge of said struts is received in the slots 582. Furthermore, an encircling angled portion (or a shoulder—at 580) is provided within the frame of the closure 580, which angled portion is designed in terms of its dimensions and form such that the closure 580 lies in the manner of a pot lid in the outflow-side opening of the inlet collecting tank 503. The inlet-side opening of the inlet collecting tank 503 is bordered by a connecting flange 582 which in this case is fastened to a supply line (not shown) for exhaust gas.

Another embodiment is illustrated in FIG. 10. At the flat tube ends, the narrow sides 612 and 613 of the flat tubes 610 have been provided with one or—as shown—two (or more) inwardly directed beads a short distance below the tube plate 621, as a result of which the bypass ducts (e.g., third channels 18 of FIG. 5) are substantially closed off. To produce the beads (deformed portions 684), a machining step can be carried out, said machining step preferably being carried out after the insertion of the internal inserts (e.g., fin 11 of FIG. 5) into the flat tubes 610. Said alternative does not require usage of any additional material.

Various features and advantages of the invention are set forth in the following claims.

The invention claimed is:

1. An exhaust gas recirculation cooler configured to cool exhaust gas from an engine, the exhaust gas recirculation cooler comprising:

a plurality of coolant ports;

an inlet tank configured to receive the exhaust gas from the engine;

an outlet tank configured to direct the exhaust gas back toward the engine;

a plurality of exhaust gas flow conduits in fluid communication with the inlet tank and the outlet tank and arranged in spaced relation to allow coolant to pass over outer surfaces of the exhaust gas flow conduits, at least one of the plurality of exhaust gas flow conduits including a first end adjacent the inlet tank, a second end adjacent the outlet tank, a first narrow side, a second narrow side opposite the first narrow side, substantially flat broad sides extending between the first narrow side and the second narrow side, a first channel adjacent the first narrow side and extending between the first end and the second end, a second channel adjacent the second narrow side and extending between the first end and the second end, and a plurality of third channels located between the first channel and the second channel and extending between the first end and the second end; and wherein the inlet tank includes a wall that inhibits the exhaust gas from flowing through the first channel while allowing exhaust gas flow through the plurality of third channels, and wherein at least a portion of the first narrow side and at least a portion of the second narrow side each include at least a portion of the outer surfaces over which coolant is allowed to pass.

2. The exhaust gas recirculation cooler of claim 1, wherein the wall is a first wall, and wherein the inlet tank further includes a second wall, and wherein the second wall inhibits the exhaust gas from flowing through the second channel while allowing exhaust gas flow through the plurality of third channels.

3. The exhaust gas recirculation cooler of claim 2, wherein the first wall and the second wall are integrally formed as a single component with the inlet tank, wherein the first wall and the second wall each extend continuously from approximately the first end of the at least one exhaust flow conduit to an exhaust gas flow inlet port of the inlet tank.

4. The exhaust gas recirculation cooler of claim 1, wherein the wall is integrally formed as a single component with the inlet tank and is located at the first end of the exhaust gas flow conduit and extends continuously from approximately the first end of the at least one exhaust flow conduit to an exhaust gas flow inlet port of the inlet tank.

5. The exhaust gas recirculation cooler of claim 4, wherein the wall of the inlet tank includes a free edge adjacent the first end of the exhaust gas flow conduit.

6. The exhaust gas recirculation cooler of claim 5, wherein the free edge contacts the first end of the exhaust gas flow conduit to substantially close off the first channel.

7. The exhaust gas recirculation cooler 1, wherein the exhaust gas flow conduit includes a fin structure that divides the exhaust gas flow conduit into the plurality of third channels.

8. The exhaust gas recirculation cooler of claim 1, wherein the first channel has a first hydraulic diameter, wherein the second channel has a second hydraulic diameter, and wherein at least one of the third channels has a third hydraulic diameter that is less than the first hydraulic diameter.

9. The exhaust gas recirculation cooler of claim 1, wherein the first narrow side has a first arcuate shape facing a first direction, and wherein the second narrow side has a second arcuate shape facing opposite the first direction of the first arcuate shape of the first narrow side.

10. An exhaust gas recirculation cooler configured to cool exhaust gas from an engine, the exhaust gas recirculation cooler comprising:

an inlet tank having an exhaust gas flow inlet port configured to receive the exhaust gas from the engine;

an outlet tank having an outlet port configured to direct the exhaust gas back toward the engine;

a first exhaust gas flow conduit in fluid communication with the inlet tank and the outlet tank, the first exhaust gas flow conduit including a first end adjacent the inlet tank,
a second end adjacent the outlet tank,
a first narrow side,
a second narrow side opposite the first narrow side,
substantially flat broad sides extending between the first narrow side and the second narrow side,
a first channel adjacent the first narrow side and extending between the first end and the second end,
a second channel adjacent the second narrow side and extending between the first end and the second end, and
a plurality of third channels located between the first channel and the second channel and extending between the first end and the second end, a first inner wall located at the first end of the first exhaust gas flow conduit to inhibit the exhaust gas from flowing through the first channel while allowing exhaust gas flow through the plurality of third channels; and a second inner wall located at the first end of the first exhaust gas flow conduit to inhibit the exhaust gas from flowing through the second channel while allowing exhaust gas flow through the plurality of third channels.

11. An exhaust gas recirculation cooler configured to cool exhaust gas from an engine, the exhaust gas recirculation cooler comprising:

an inlet configured to receive the exhaust gas from the engine;

an outlet configured to direct the exhaust gas back toward the engine;

an exhaust gas flow conduit including
a first end adjacent the inlet,
a second end adjacent the outlet,
a first narrow side,
a second narrow side opposite the first narrow side,
substantially flat broad sides extending between the first narrow side and the second narrow side,
a first channel adjacent the first narrow side and extending between the first end and the second end,
a second channel adjacent the second narrow side and extending between the first end and the second end, and
a plurality of third channels located between the first channel and the second channel and extending between the first end and the second end;

a wall having a first portion located at the first end of the exhaust gas flow conduit to inhibit the exhaust gas from flowing through at least one of the first channel and the second channel while allowing exhaust gas flow through the plurality of third channels; and a header that receives a portion of the exhaust gas flow conduit, wherein a second portion of the wall is directly connected to the header.

12. The exhaust gas recirculation cooler of claim 1, wherein a first coolant port of the plurality of coolant ports is adjacent to the first narrow side and a second coolant port of the plurality of coolant ports is adjacent to the second narrow side, such that spaces around the outer surfaces of at least some of the plurality exhaust flow conduits direct coolant flow between the first coolant port and the second coolant port.

13. The exhaust gas recirculation cooler of claim 9, wherein the at least one exhaust gas flow conduit further includes an insert extending between the flat broad sides, and wherein the first arcuate shape precludes the insert from extending to the first narrow side and the second arcuate shape precludes the insert from extending to the second narrow side.

14. The exhaust gas recirculation cooler of claim 10, further including, a second exhaust gas flow conduit in fluid communication with the inlet tank and the outlet tank, the second exhaust gas flow conduit including,
an third end adjacent the inlet tank, a forth end adjacent the outlet tank,
a third narrow side,
a forth narrow side,
substantially flat broad sides extending between the third narrow side and the forth narrow side,
a forth channel adjacent the third narrow side and extending between the third end and the forth end,
a fifth channel adjacent the forth narrow side and extending between the third end and the forth end, and
a plurality of sixth channels located between the forth channel and the fifth channel and extending between the third end and the forth end,
wherein the at least one inner wall permits flow into both the forth channel or the fifth channel.

15. The exhaust gas recirculation cooler of claim 10, wherein the first channel, the second channel, and the third channels of the first exhaust conduit are all continuously fluidly connected to the inlet port.

16. The exhaust gas recirculation cooler of claim 15, wherein the first channel and the second channel are each fluidly connected to the inlet port via a tortuous path.

17. The exhaust gas recirculation cooler of claim 10, wherein the inlet tank further includes at least one outer wall having an inner surface fluidly separated from the exhaust gas flow inlet port by the at least one inner wall.

18. The exhaust gas recirculation cooler of claim 10, further comprising
a third inner wall located at the second end of the first exhaust gas flow conduit to inhibit the exhaust gas from flowing through the first channel while allowing exhaust gas flow through the plurality of third channels, and
a fourth inner wall located at the second end of the first exhaust gas flow conduit to inhibit the exhaust gas from flowing through the second channel while allowing exhaust gas flow through the plurality of third channels.

19. The exhaust gas recirculation cooler of claim 11, wherein the second portion of the wall extends away from the first portion of the wall.

20. The exhaust gas recirculation cooler of claim 11, wherein first portion of the wall is fluidly connected to the inlet and the second portion of the wall is fluidly separated from the inlet by the first portion of the wall.

* * * * *